(12) United States Patent
Sakai et al.

(10) Patent No.: US 6,569,052 B2
(45) Date of Patent: May 27, 2003

(54) CONTROL OF INFINITELY VARIABLE TRANSMISSION

(75) Inventors: Hiromasa Sakai, Yokosuka (JP); Motoharu Nishio, Yokohama (JP); Hiroaki Kuramoto, Yokosuka (JP); Shinichiro Joe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/887,094

(22) Filed: Jun. 25, 2001

(65) Prior Publication Data

US 2002/0028722 A1 Mar. 7, 2002

(30) Foreign Application Priority Data

Jul. 21, 2000 (JP) .................................. 2000-220654

(51) Int. Cl.[7] .............................................. F16H 37/02
(52) U.S. Cl. ......................................... 475/214; 701/51
(58) Field of Search .................. 475/214, 216, 475/215, 206, 193, 208; 477/37, 901; 701/51, 52, 54, 61

(56) References Cited

U.S. PATENT DOCUMENTS

| | | | | |
|---|---|---|---|---|
| 5,665,021 A | * | 9/1997 | Inoue ............................. 476/4 |
| 5,820,510 A | * | 10/1998 | Ueda et al. ..................... 475/214 |
| 5,984,829 A | * | 11/1999 | Minagawa et al. ............. 477/98 |
| 6,024,674 A | * | 2/2000 | Sato et al. ..................... 477/102 |
| 6,027,425 A | * | 2/2000 | Sakaguchi et al. ............. 477/111 |
| 6,030,311 A | * | 2/2000 | Osumi ........................... 476/10 |
| 6,036,617 A | * | 3/2000 | Kidokoro et al. ............... 476/3 |
| 6,095,942 A | * | 8/2000 | Yamaguchi et al. ............ 477/40 |
| 6,132,333 A | * | 10/2000 | Inoue et al. ................... 477/37 |
| 6,260,440 B1 | | 7/2001 | Cronin et al. |
| 6,312,357 B1 | * | 11/2001 | Sakai et al. ................... 477/37 |
| 6,334,835 B1 | * | 1/2002 | Tanaka et al. ................ 477/187 |
| 6,351,700 B1 | * | 2/2002 | Muramoto et al. ............ 701/51 |
| 6,377,882 B1 | * | 4/2002 | Ito ................................ 477/102 |
| 2001/0003108 A1 | * | 6/2001 | Goi et al. ..................... 475/208 |

FOREIGN PATENT DOCUMENTS

| | | |
|---|---|---|
| EP | 0 866 242 A2 | 9/1998 |
| EP | 0 967 107 A1 | 12/1999 |
| JP | 07-269686 | 10/1995 |
| JP | 10/110802 | 4/1998 |
| JP | 10-246326 | 9/1998 |
| JP | 10-325459 | 12/1998 |
| JP | 11-63184 | 3/1999 |
| JP | 11-247964 | 9/1999 |

* cited by examiner

*Primary Examiner*—Rodney H. Bonck
*Assistant Examiner*—David D. Le
(74) *Attorney, Agent, or Firm*—Foley & Lardner

(57) ABSTRACT

In an infinitely variable transmission, a continuously variable transmission (2) outputs the rotation of an input shaft (1) at an arbitrary speed ratio, and a fixed speed ratio transmission (3) outputs the rotation of the input shaft (1) at a fixed speed ratio. A planetary gear set (5) varies the rotation direction and speed of the output shaft (6) according to the difference of the output rotation speed of the fixed speed ratio transmission (2) and the output rotation speed of the continuously variable transmission (2). A sensor (81) which detects the rotation speed of the input shaft (1) and a sensor (82) which detects the output rotation speed of the continuously variable transmission (2) are provided, and a microprocessor (80) precisely calculates the rotation direction and rotation speed of the output shaft (6) from these rotation speeds.

12 Claims, 19 Drawing Sheets

81 ROTATION SPEED SENSOR
82 ROTATION SPEED SENSOR

81 ROTATION SPEED SENSOR
82 ROTATION SPEED SENSOR

82 ROTATION SPEED SENSOR
83 ROTATION SPEED SENSOR

CONTROL OF INFINITELY VARIABLE TRANSMISSION

FIELD OF THE INVENTION

This invention relates to control of an infinitely variable transmission for a vehicle.

BACKGROUND OF THE INVENTION

Tokkai Hei 10-325459 published by the Japanese Patent Office in 1998 and Tokkai Hei 11-63184 published by the Japanese Patent Office in 1999, disclose an infinitely variable transmission wherein a fixed speed ratio transmission and a toroidal continuously variable transmission are combined with a planetary gear set so that the speed ratio can be varied up to infinity. The speed ratio of the infinitely variable transmission is controlled based on the vehicle speed and the speed ratio of the toroidal continuously variable transmission.

SUMMARY OF THE INVENTION

The vehicle speed is detected from the rotation speed of the output shaft of the infinitely variable transmission. The speed ratio of the continuously variable transmission is calculated from the rotation speeds of the input/output shafts of the toroidal continuously variable transmission. For this purpose, rotation speed sensors are provided respectively for the output shaft of the infinitely variable transmission, input shaft of the toroidal continuously variable transmission and output shaft of the toroidal continuously variable transmission.

The rotation speed sensor may for example comprise a gear which rotates together with a rotating body, and a Hall element which outputs a pulse according to the passage of a gear tooth, and the rotation speed is detected by counting pulses in a unit time. The output shaft of the infinitely variable transmission does not rotate when the vehicle is stationary, and therefore pulses are not counted. Also, the pulse detection interval is extremely long when the vehicle is moving at a low speed. Therefore, when the rotation of the output shaft of the infinitely variable transmission is detected by a rotation sensor having this construction, it is difficult to determine in a short time if the vehicle is stationary or it is moving at a low speed, so the speed detection precision falls in the speed region close to zero.

The infinitely variable transmission has a speciality that the speed ratio can be varied continuously including infinity. The speed ratio becomes infinity when the output shaft of the infinitely variable transmission has stopped while the input shaft of the infinitely variable transmission is rotating. In other words, the speed ratio becomes infinity when the vehicle is stationary while an engine of the vehicle is running. When the speed ratio of the toroidal continuously variable transmission is varied from this vehicle stationary state, the rotation direction of the output shaft of the continuously variable transmission, i.e., the vehicle moving direction, is determined according to the direction of the variation of the speed ratio of the continuously variable transmission. Consequently, if the vehicle speed detecting precision falls in the speed region close to zero, speed ratio control in the very low speed region including the stationary state of the vehicle may be unstable.

Further, the vehicle speed detected by the above rotation speed sensor is an absolute value, and cannot make a distinction between forward motion and reverse motion of the vehicle. When a selector lever of the vehicle is in the forward or reverse travel range while the vehicle is in the stationary state or in its vicinity, the vehicle generally needs a creep torque. When the vehicle has stopped on a rising slope and an accelerator pedal of the vehicle is released while the selector lever is in the forward travel range, the vehicle may move rearwards according to the steepness of the slope. In this case, it is desirable to rapidly detect the reverse motion of the vehicle and increase the creep torque so as to stop the reverse motion. In order to perform such a torque control, a distinction must be made between forward motion and reverse motion of the vehicle.

It is therefore an object of this invention to increase the detection precision of an output shaft rotation speed of an infinitely variable transmission in a very low speed region including zero.

It is a further object of this invention to discriminate between the rotation directions of the output shaft of the infinitely variable transmission.

It is still a further object of this invention to reduce the number of sensors required to control the infinitely variable transmission.

In order to achieve the above objects, this invention provides a controller for such an infinitely variable transmission that comprises an input shaft, a continuously variable transmission which outputs the rotation of the input shaft at an arbitrary speed ratio, a fixed speed ratio transmission which outputs the rotation of the input shaft at a fixed speed ratio, a differential mechanism having a first rotation element which rotates according to an output rotation of the continuously variable transmission, a second rotation element which rotates according to an output rotation of the fixed speed ratio transmission, and a third rotation element which varies a rotation direction and a rotation speed according to a difference between a rotation speed of the first rotation element and a rotation speed of the second rotation element, and an output shaft joined to the third rotation element.

The controller comprises a first sensor which detects the rotation speed of the input shaft, a second sensor which detects the output rotation speed of the continuously variable transmission, and a microprocessor programmed to calculate the rotation speed of the output shaft from the rotation speed of the input shaft and the output rotation speed of the continuously variable transmission, and to control the speed ratio of the continuously variable transmission based on the rotation speed of the output shaft.

This invention also provides a control method for the infinitely variable transmission. The method comprises detecting the rotation speed of the input shaft, detecting the output rotation speed of the continuously variable transmission, calculating the rotation speed of the output shaft from the rotation speed of the input shaft and the output rotation speed of the continuously variable transmission, and controlling the speed ratio of the continuously variable transmission based on the rotation speed of the output shaft.

The details as well as other features and advantages of this invention are set forth in the remainder of the specification and are shown in the accompanying drawings.

DESCRIPTION OF THE PREFERRED EMBODIMENTS

Figure 1:
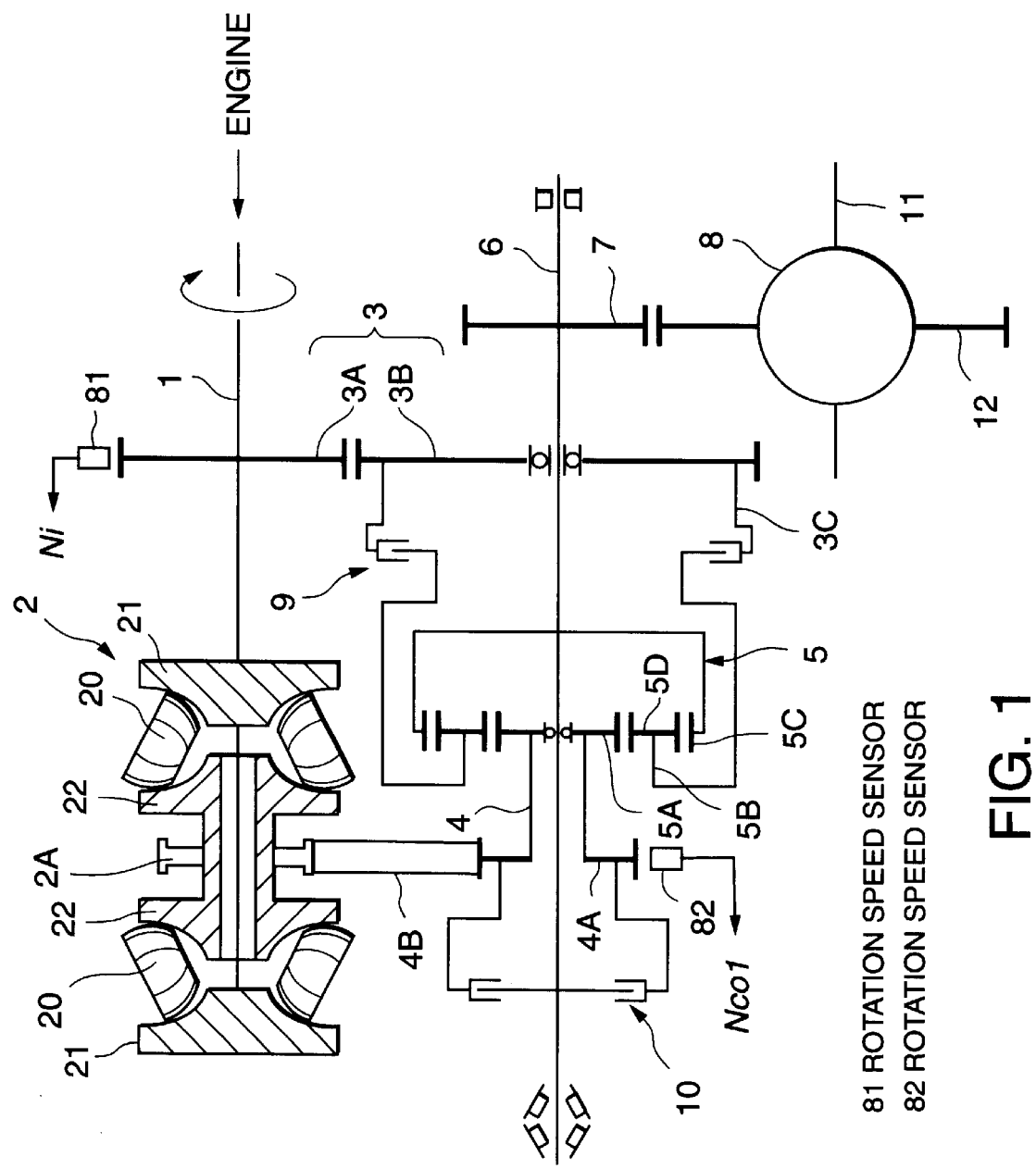
FIG. 1 is a schematic diagram of an infinitely variable transmission according to this invention.

Referring to FIG. 1 of the drawings, an infinitely variable transmission (referred to hereafter as IVT) comprises an input shaft 1 connected to an engine of a vehicle, a toroidal continuously variable transmission (referred to hereafter as CVT) 2, a reduction gear set 3 as a fixed speed ratio transmission, a planetary gear set 5 as a differential mechanism, and an output shaft 6.

The input shaft 1 is connected to an input gear 3A of the reduction gear set 3. A CVT input shaft 1B of the toroidal CVT 2 rotates together with the input shaft 1 via a loading cam, not shown.

The toroidal CVT 2 comprises two sets of toroidal units comprising an input disk 21 and output disk 22. A pair of power rollers 20 are gripped between these facing input disk 21 and output disk 22. The rotation of the two output disks 22 is output from a sprocket 2A to a sprocket 4A supported free to rotate on the output shaft 6 arranged parallel to the CVT input shaft 1B via a chain 4A.

The reduction gear set 3 is provided with an output gear 3B supported free to rotate on the output shaft 6. The output gear 3B meshes with the input gear 3A, and the rotation of the input shaft 1 is output to the output gear 3B after reduction according to a gear ratio of the input gear 3A and output gear 3B.

The planetary gear set 5 comprises a sun gear 5A, planet gears 5D, ring gear 5C and a carrier 5B which supports planet gears 5D. The sun gear 5A is connected to the sprocket 4A via a sleeve-shaped hollow shaft 4 supported on the circumference of the output shaft 6. The sprocket 4A is also connected to the output shaft 6 via a direct clutch 10.

The planet gears 5D are plural pinions arranged between the sun gear 5A and ring gear 5C, and are supported free to rotate and free to turn around the sun gear 5A by the carrier 5B. The output gear 3B of the reduction gear set 3 and carrier 5B are connected via a power recirculation clutch 9.

The ring gear 5C is connected to the output shaft 6.

A final output gear 7 is fixed to the output shaft 6. The rotation of the final output gear 7 is output to a vehicle drive shaft 11 via a final gear 12 and differential 8.

The speed ratio ii of this IVT is expressed as the ratio of the rotation speed of the input shaft 1 and rotation speed of the output shaft 6. The speed ratio ic of the toroidal CVT 2 is expressed as the ratio of the rotation speeds of the input disk 21 and output disk 22. The rotation speed of the input disk 21 is equal to a rotation speed Ni of the input disk 1.

In the following description, the speed ratio ii of the IVT is referred to as IVT speed ratio and the speed ratio ic of the CVT 2 is referred to as CVT speed ratio.

A rotation speed sensor 81 which detects the rotation speed of the input gear 3A of the reduction gear set 3, and a rotation speed sensor 82 which detects the rotation speed Nco1 of the sprocket 4A, are installed in the IVT. Here, the rotation speed of the input gear 3A is equal to the rotation speed Ni of the input shaft 1 and CVT input shaft 1B and it is also equal to the rotation speed Ne of the engine. The rotation speed Nco1 of the sprocket 4A is equal to the rotation speed of the sun gear 5A. The rotation speed Ni and rotation speed Nco1 respectively input as signals to a control unit 80 shown in FIG. 2.

The control unit 80 comprises a central processing unit (CPU), read-only memory (ROM), random access memory (RAM) and input/output interface (I/O interface).

The vehicle is provided with a brake pedal, accelerator pedal and a selector lever.

Figure 2:
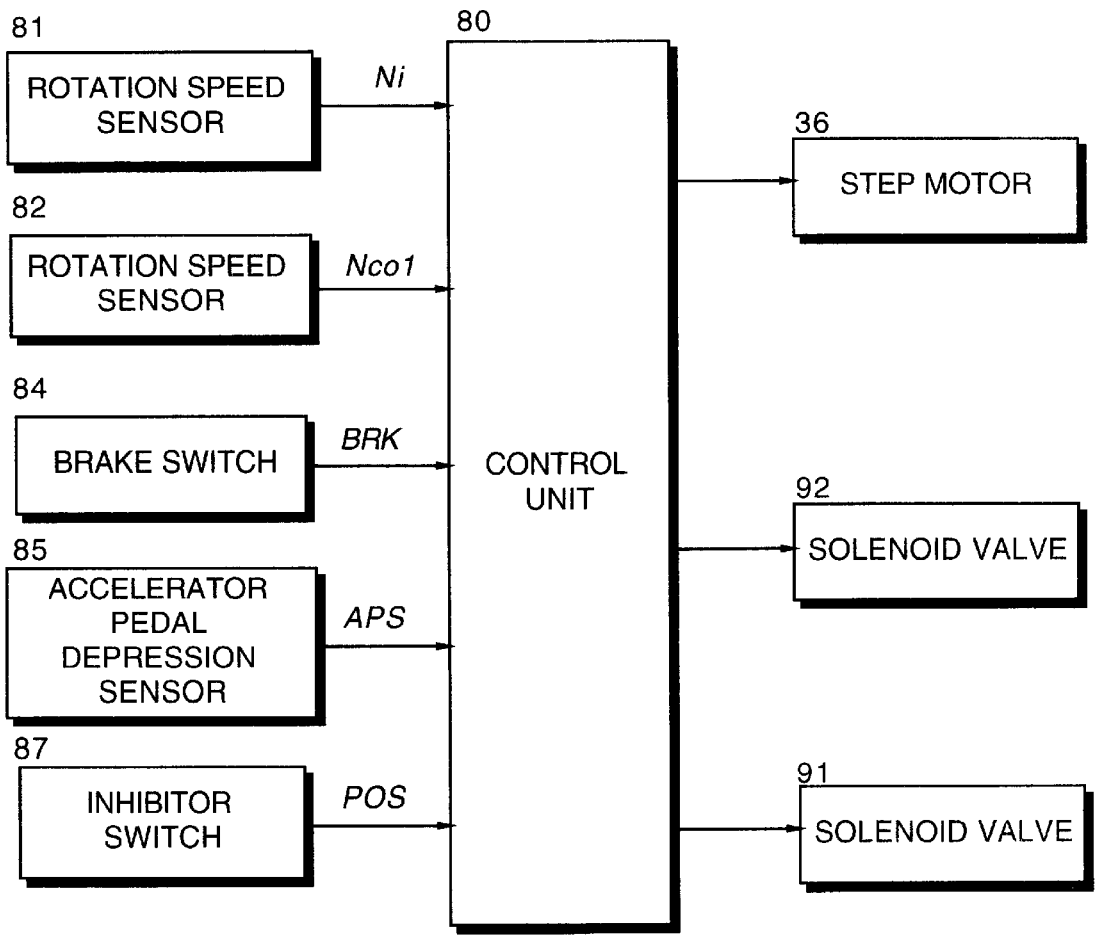
FIG. 2 is a schematic diagram of a controller for the infinitely variable transmission according to this invention.

Referring to FIG. 2, a brake signal BRK from a brake switch 84 which detects whether or not a brake pedal is depressed, a depression amount signal APS from the accelerator pedal depression sensor 85 which detects a depression amount of the accelerator pedal, and a selector position signal POS from an inhibitor switch 87 which detects a selection position of the selector lever, are also input to the control unit 80. The selection position signal POS differentiates between a forward range (D), reverse range (R), neutral range (N) and parking range (P).

Based on these signals, the control unit 80 engages and releases the power recirculation clutch 9 via an actuator 92 and the direct clutch 10 via an actuator 91. The speed ratio and transmission torque during forward motion and reverse motion of the vehicle are also controlled by varying the speed ratio ic of the toroidal CVT 2.

In a direct mode, wherein the power recirculation clutch 9 is released and the direct clutch 10 is engaged, the IVT outputs the output rotation of the toroidal CVT 2 to the final output shaft 6. On the other hand, in a power recirculation mode wherein the power recirculation clutch 9 is engaged and the direct clutch 10 is disengaged, the IVT varies the rotation direction and rotation speed of the output shaft 6 according to the speed difference between the output rotation of the toroidal CVT 2 and output rotation of the reduction gear set 3.

Figure 3:
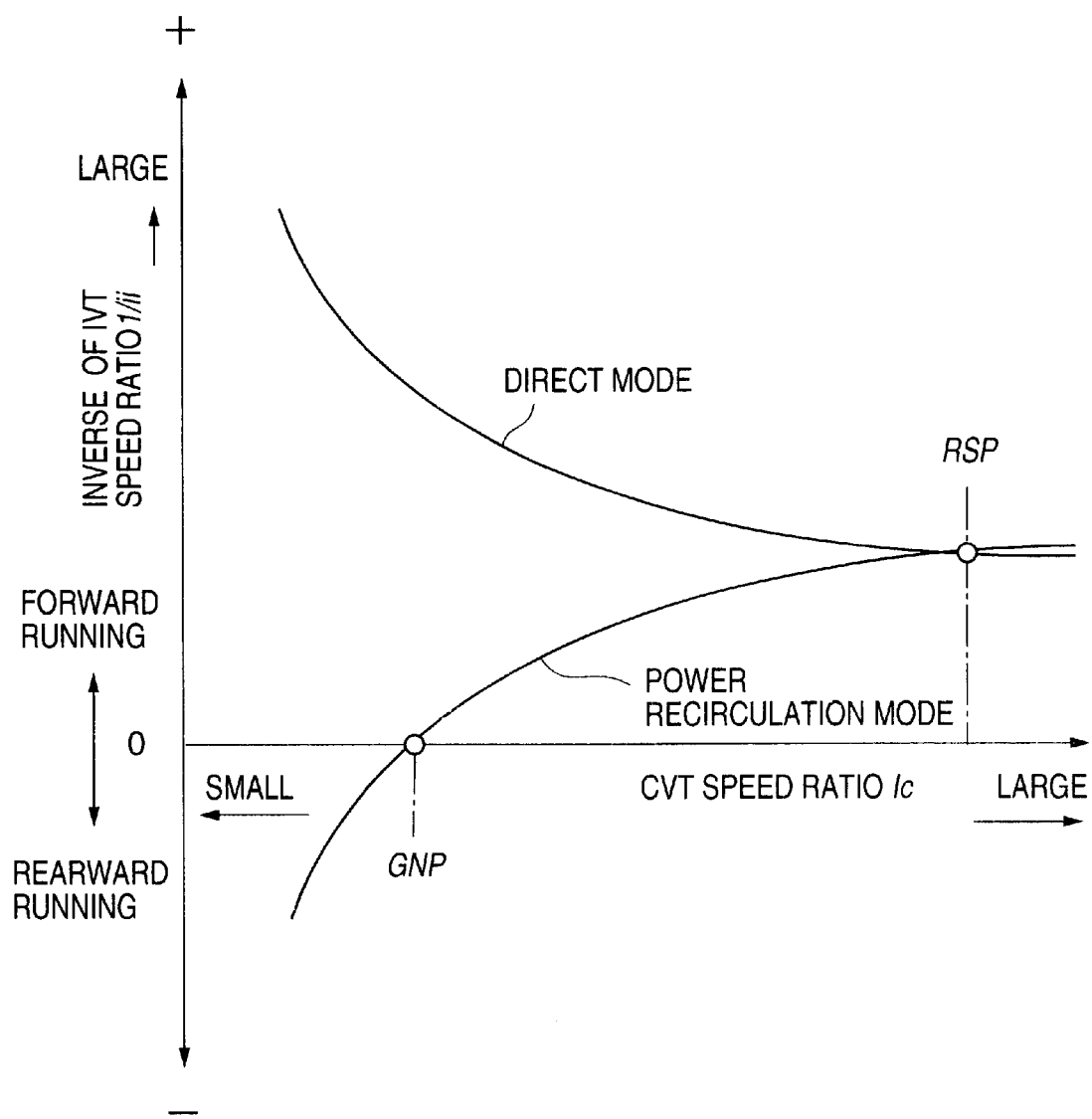
FIG. 3 is a diagram showing the contents of a map specifying the relation between a CVT speed ratio ic and an IVT speed ratio ii stored in a control unit according to this invention.

As shown in FIG. 3, the control unit 80 applies the power recirculation mode when the vehicle is reversing and when it is moving forward at a low speed where the IVT speed ratio ii is large, and applies the direct mode when it is moving forward at high speed where the IVT speed ratio ii is small. The change-over between these modes is performed at a revolution synchronization point (RSP) where the rotation of the output shaft 6 is equal in both modes. In the power recirculation mode, the rotation direction of the output shaft 6 is changed over at a geared neutral point (GNP) where the output shaft 6 stops its rotation.

The CVT speed ratio ic varies according to the gyration angle of the power rollers 20. The gyration angle of the power rollers 20 is controlled by a step motor 36. The control unit 80 controls the speed ratio ic of the toroidal CVT 2 by outputting a signal corresponding to the target speed ratio ic to the step motor 36.

The control unit 80 determines the target value of the speed ratio ic in the following way.

Figure 4:
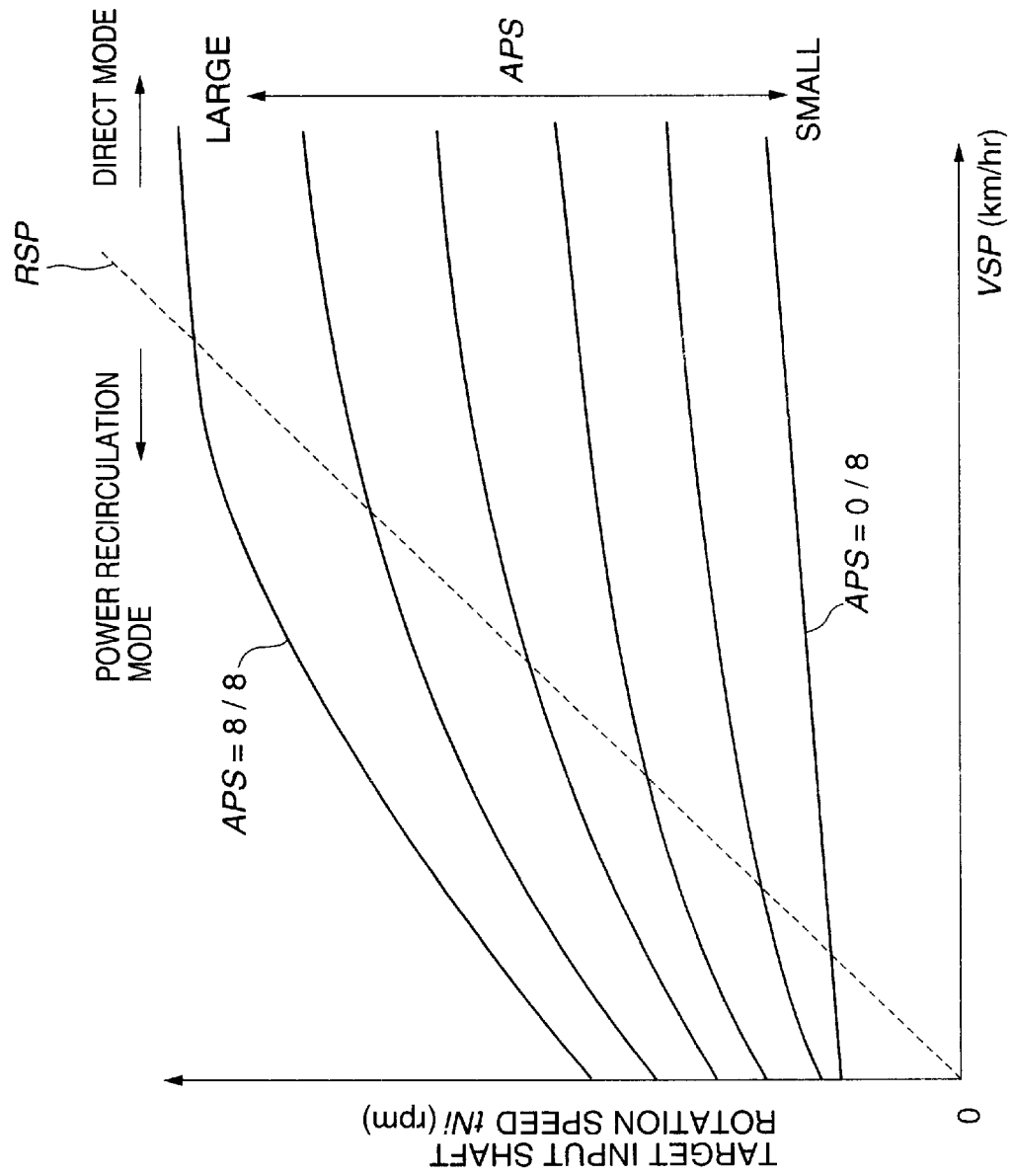
FIG. 4 is a diagram showing the contents of a map specifying the relation between an accelerator pedal depression amount, vehicle speed and target input shaft rotation speed stored in the control unit.

During normal motion in the drive range (D), a target input shaft rotation speed tNi is calculated by looking up a map shown in FIG. 4 based on the accelerator pedal depression amount APS and vehicle speed VSP. Here, the vehicle speed VSP is calculated by multiplying the rotation speed No of the output shaft 6 of the IVT by a constant K depending on the final gear ratio and the diameter of the tires of the vehicle. The calculated target input shaft rotation speed tNi is equal to the target engine rotation speed.

Next, the target input shaft rotation speed tNi is divided by the rotation speed No of the output shaft 6 to determine a target value of the IVT speed ratio ii. The target value of the IVT speed ratio ii is converted to a target value of the speed ratio ic of the toroidal CVT 2, and the step motor 36 is feedback controlled so that the speed ratio ic of the toroidal CVT 2 coincides with the target value.

Figure 5:
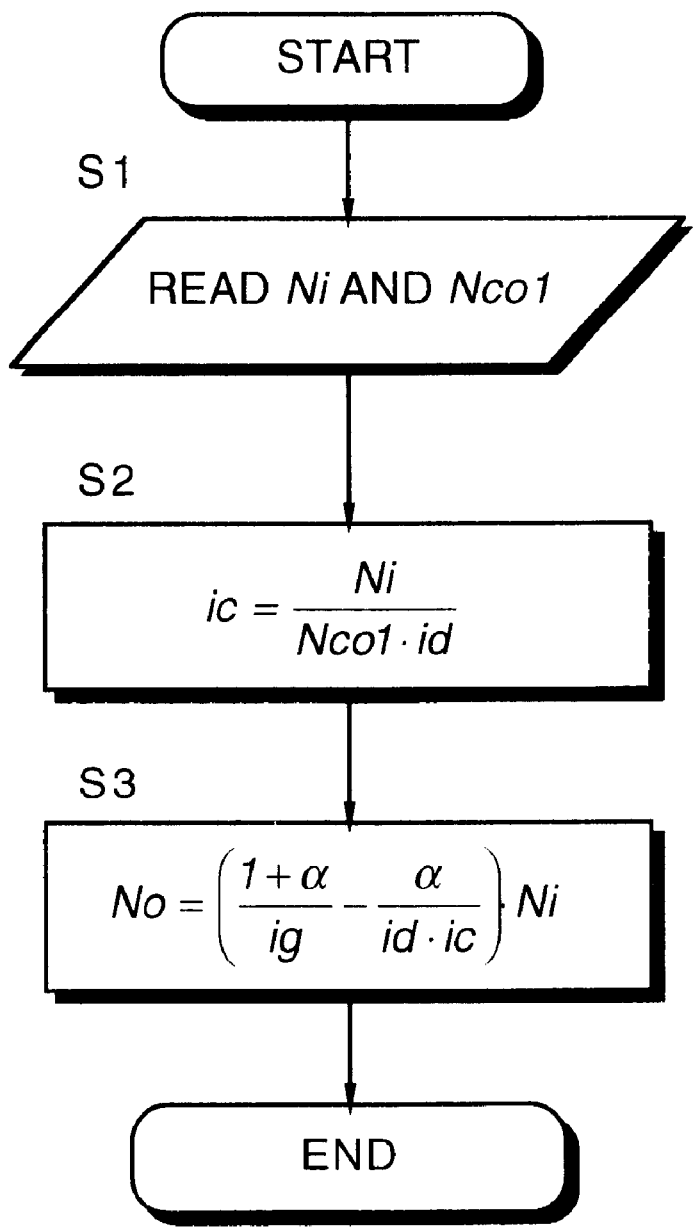
FIG. 5 is a flowchart describing a vehicle speed calculation routine performed by the control unit.

To perform this control, the control unit 80 calculates the rotation speed No of the output shaft 6 of the IVT by a calculation routine shown in FIG. 5. This routine is performed at an interval of ten milliseconds.

First, in a step S1, the rotation speed Ni of the input shaft 1 and the rotation speed Nco1 of the sprocket 4A are read.

In a next step S2, the speed ratio ic of the toroidal CVT 2 is calculated by the following equation (1).

$$ic = \frac{Ni}{Nco1 \cdot id} \tag{1}$$

where, id=coefficient to convert the rotation speed of the sprocket 4A to the rotation speed of the output disk 22.

In a next step S3, the rotation speed No of the IVT output shaft 6 is calculated by the following equation (2) from the speed ratio ic of the toroidal CVT 2.

$$No = \left(\frac{1+\alpha}{ig} - \frac{\alpha}{id \cdot ic}\right) \cdot Ni \tag{2}$$

$$\alpha = \frac{Zs}{Zr}$$

where, ig=reduction ratio of reduction gear set 3,
Zs=number of teeth of sun gear 5A, and
Zr=number of teeth of ring gear 5C.

In equation (2), α, ig, id and K are all constants, and $$\frac{1+\alpha}{ig}$$

is also a constant. The input shaft 1 always rotates in the same direction, and the rotation speed Ni of the input shaft 1 is always a positive value. Therefore, the rotation speed No of the IVT output shaft 6 is determined only according to the speed ratio ic of the CVT 2, and when the vehicle is moving forward, i.e., when the CVT speed ratio ic is larger than the geared neutral point GNP, the rotation speed No of the IVT output shaft 6 is a positive value. When the vehicle is reversing, i.e., when the CVT speed ration ic is less than the geared neutral point GNP, the rotation speed No of the IVT output shaft 6 is a negative value.

For example, at a very low vehicle speed of VSP=1 km/hr, the rotation speed of the output shaft 6 is approximately 30 revolutions per minute (rpm). The rotation speed Ni of the input shaft 1 detected by the rotation speed sensor 81 at this time is Ni≧600 rpm, and the rotation speed Nco1 of the sprocket 4A detected by the rotation speed sensor 82 is Nco1≧1000 rpm.

All these rotation speeds are more than 20 times the rotation speed of the output shaft 6 or ring gear 5C, so the pulses used by the rotation speed sensors 81 and 82 are output at sufficiently high frequency to obtain good detection precision. Therefore, the rotation speed No of the IVT output shaft 6 in the low speed region including the rotation speed No=0 can also be detected with high precision.

This routine may be applied in both the power recirculation mode and the direct mode. Equation (2) may be replaced by the following equation (2A).

$$No = \frac{Ni + Ni \cdot \alpha}{ig} - \frac{Ni \cdot \alpha}{id \cdot ic} \tag{2a}$$

$$\frac{Ni}{ig}$$

in equation (2A) is the rotation speed of the carrier 5B, and $$\frac{Nl}{id \cdot ic}$$

is the rotation speed of the sprocket 4A. In the direct mode, the sprocket 4A, sun gear 5A, carrier 5B and ring gear 5C rotate together with the output shaft 6, and the rotation speed of the carrier 5B is the same as the rotation speed of the sprocket 4A. Therefore, in the direct mode, equation (2A) may be simplified as the following equation (2B).

$$No = \frac{Ni}{ig} = Ncol \tag{2B}$$

As a result, in the flowchart of FIG. 5, a step may be provided to distinguish between the power recirculation mode and direct mode, and in the direct mode, equation (2B) may be used instead of equation (2).

Figure 6:
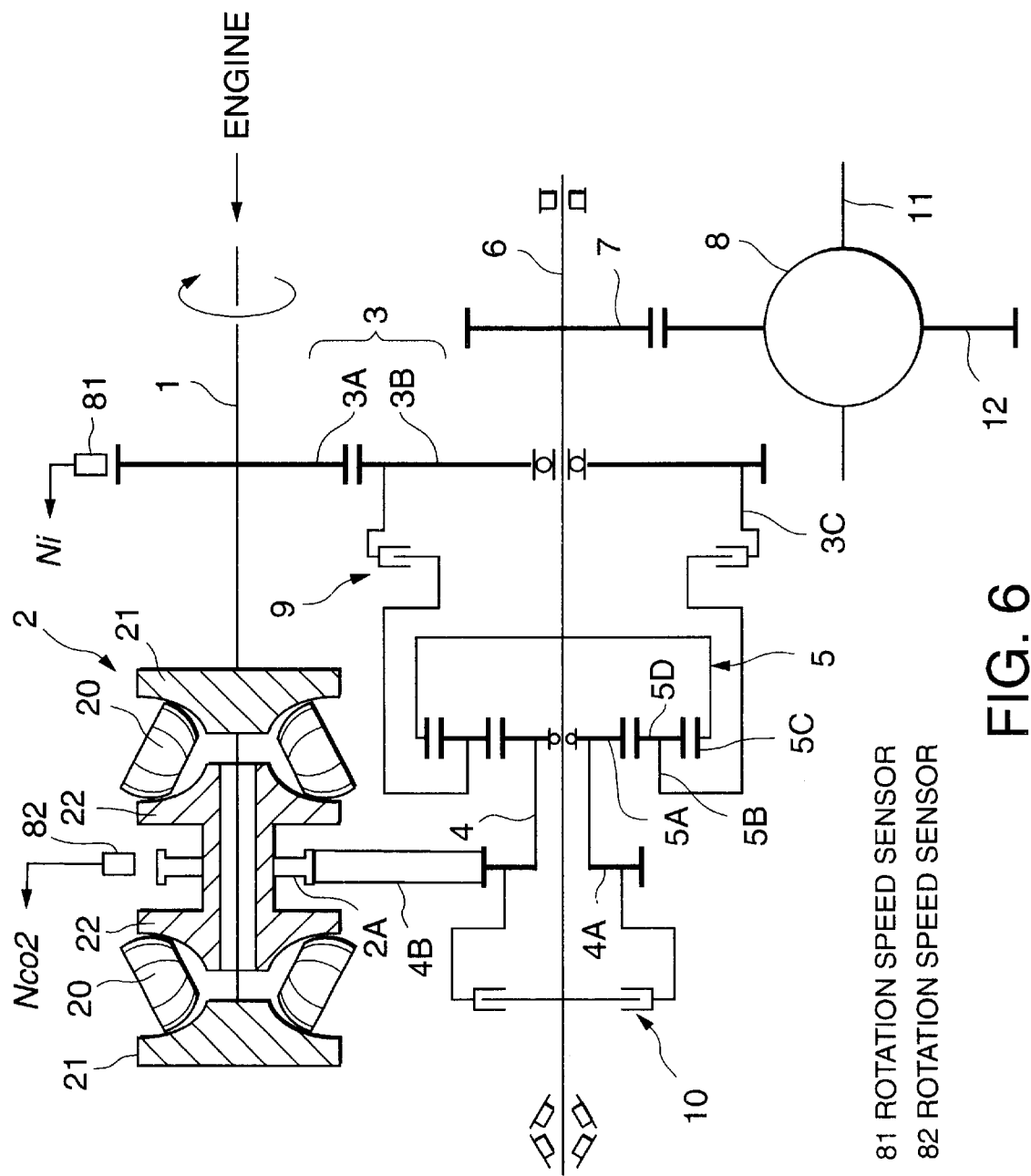
FIG. 6 is similar to FIG. 1, but showing a second embodiment of this invention.

Next, a second embodiment of this invention will be described referring to FIGS. 6 and 7.

This embodiment differs from the first embodiment in the arrangement of the rotation speed sensor 82. In this embodiment, the rotation speed sensor 82 is arranged to face the sprocket 2A in order to detect the rotation speed of the output disk 22 of the toroidal CVT 2. The remaining features of the hardware are identical to those of the first embodiment.

Figure 7:
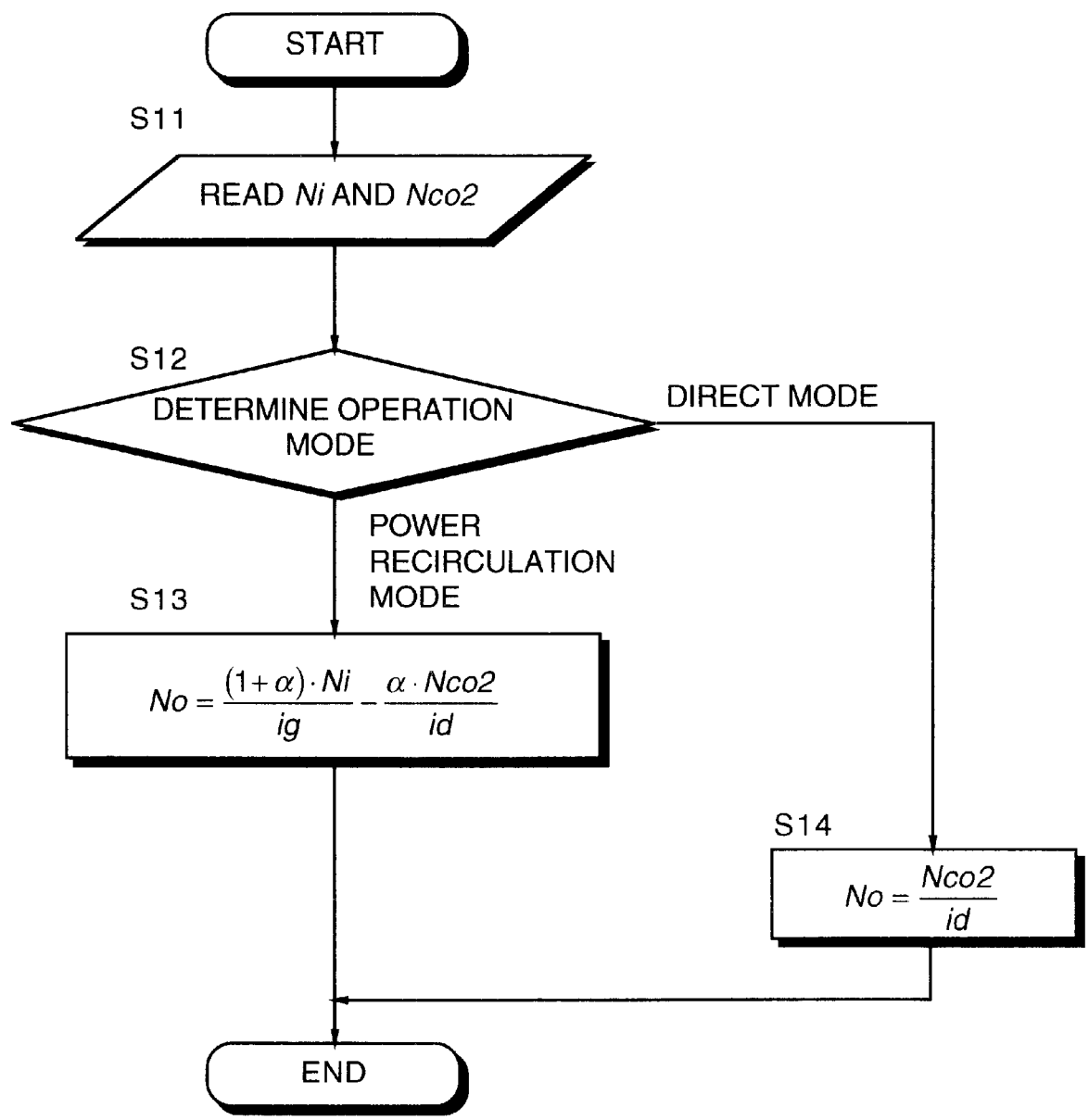
FIG. 7 is a flowchart describing a vehicle speed calculation routine according to the second embodiment of this invention.

In this embodiment, the control unit 80 calculates the CVT speed ratio ic and the rotation speed No of the IVT output shaft 6 using the routine of FIG. 7. This routine is also performed at an interval of ten milliseconds.

First, in a step S11, the rotation speed Ni of the input shaft 1 and the rotation speed Nco2 of the output disk 22 are read.

In a next step S12, it is determined whether or not the present running mode is the power recirculation mode or the direct mode. The power recirculation clutch 9 and direct clutch 10 are respectively engaged and disengaged according to command signals from the control unit 80 to the actuators 91, 92, so the present running mode can be determined from these command signals.

When, as a result of the determination, the present running mode is the power recirculation mode, the routine proceeds to a step S13. Here, the rotation speed No of the IVT output shaft 6 is calculated by the following equation (3).

$$No = \text{ring gear rotation speed} \cdot K \tag{3}$$
$$= \{(1 + \alpha) \cdot \text{carrier rotation speed} - \alpha \cdot$$
$$\text{sun gear rotation speed}\}$$
$$= \frac{(1 + \alpha) \cdot Ni}{ig} - \frac{\alpha \cdot Nco2}{id}$$

On the other hand, when the present running mode is the direct mode in a step S12, the routine proceeds to a step S14.

In the step S14, the rotation speed No of the IVT output shaft 6 is computed by the following equation (4).

$$No = \text{ring gear rotation speed} \tag{4}$$
$$= \text{sun gear rotation speed}$$
$$= \frac{Nco2}{id}$$

The constants α, ig, id used in equations (3) and (4) are identical to the constants used in equations (1) and (2) of the first embodiment.

In this embodiment also, the rotation speed No of the IVT output shaft 6 can be precisely detected as a positive or negative value corresponding to a forward motion or reverse motion of the vehicle. Equation (4) is a simplified equation obtained by limiting equation (3) to the direct mode. Therefore, the step S12 which determines the running mode and the step S14 which performs the calculation of equation (4) may be omitted, and the routine can be constructed to calculate the vehicle speed VSP in the step S13 regardless of the running mode.

A third embodiment of this invention will now be described referring to FIGS. 8 and 9.

Figure 8:
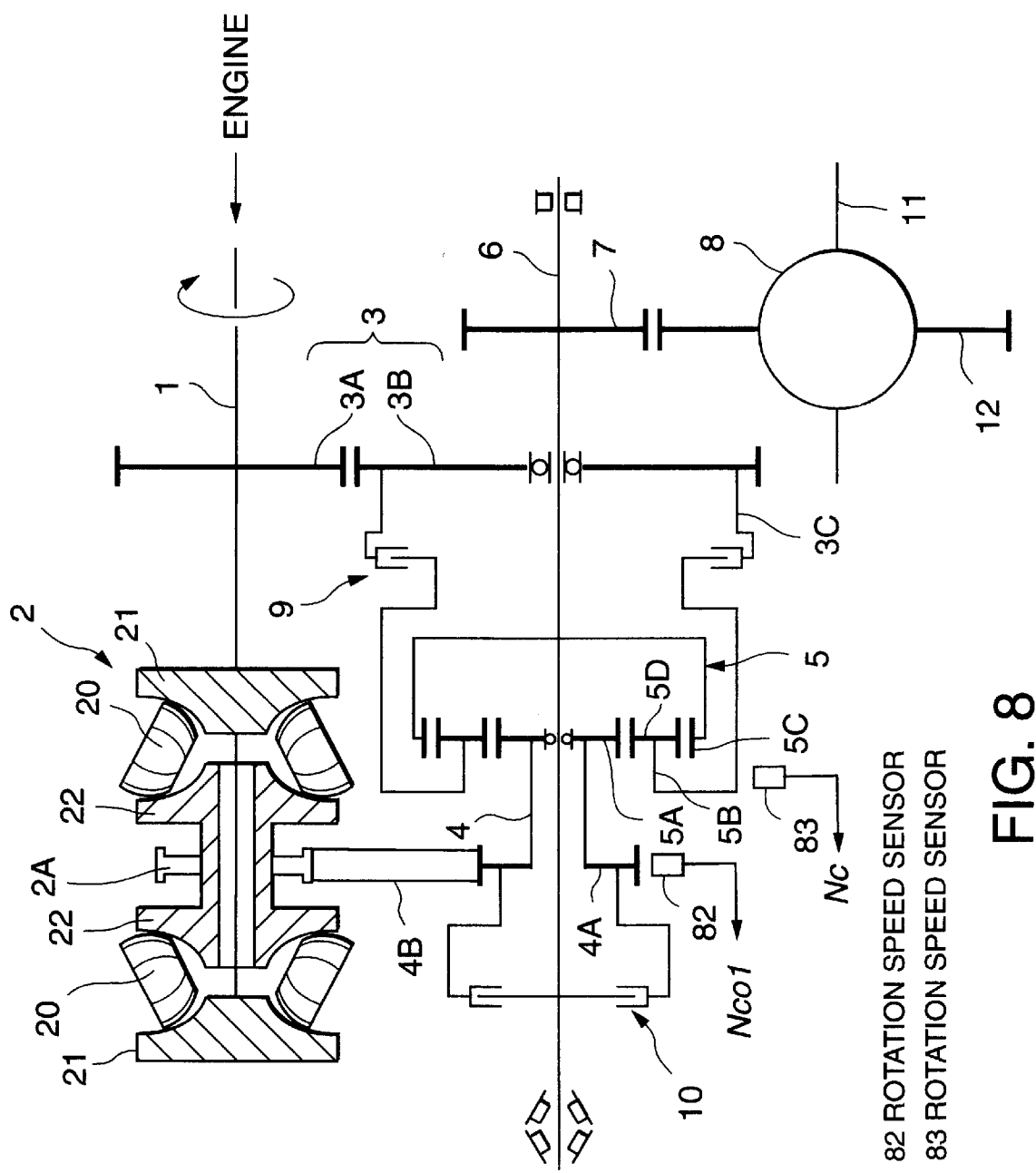
FIG. 8 is similar to FIG. 1, but showing a third embodiment of this invention.

Referring to FIG. 8, a carrier rotation speed sensor 83 which detects a rotation speed Nc of the carrier 5B is added instead of the rotation speed sensor 81 of the first embodiment, the remaining features of the construction being identical to those of the first embodiment.

Figure 9:
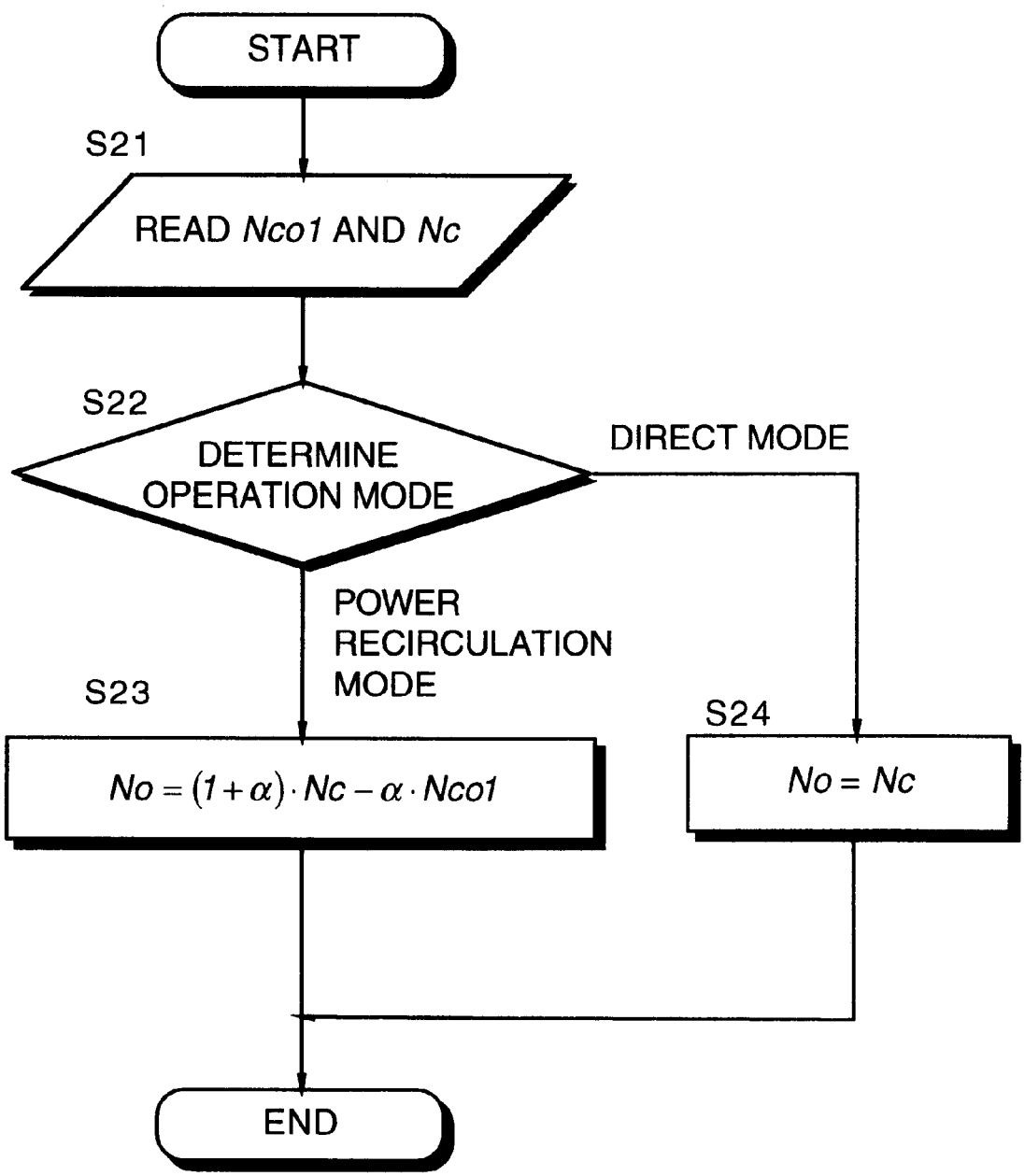
FIG. 9 is a flowchart describing a vehicle speed calculation routine according to the third embodiment of this invention.

The control unit 80 calculates the CVT speed ratio ic and the rotation speed No of the IVT output shaft 6 by a routine shown in FIG. 9. This routine is also performed at an interval of ten milliseconds.

First, in a step S21, the rotation speed Nco of the sprocket 4A and the rotation speed Nc of the carrier 5B are read.

In a next step S22, it is determined whether the present running mode is the power recirculation mode or the direct mode from the state of the power recirculation mode clutch 9 and direct mode clutch 10, as in the step S12 of the second embodiment.

When the present running mode is the power recirculation mode, the routine proceeds to a step S23, and the rotation speed No of the IVT output shaft 6 is calculated from the following equation (6).

$$No = \text{ring gear rotation speed} \tag{6}$$
$$= \{(1 + \alpha) \cdot \text{carrier rotation speed} - \alpha \cdot$$
$$\text{sun gear rotation speed}\}$$
$$= (1 + \alpha) \cdot Nc - \alpha \cdot Ncol$$

When the present running mode is the direct mode, the routine proceeds to a step S24 and the rotation speed No of the IVT output shaft 6 is computed from the following equation (7).

$$No = \text{ring gear rotation speed} \tag{7}$$
$$= \text{sun gear rotation speed}$$
$$= Ncol$$
$$= Nc$$

The constants α and id used in equations (5)-(7) are identical to those used in equations (1) and (2) of the first embodiment.

In this embodiment also, the rotation speed No of the IVT output shaft 6 can be precisely detected as a positive and negative value corresponding to forward motion or reverse motion of the vehicle.

Equation (7) is a simplified equation limiting equation (6) to the direct mode. Therefore, the step S23 which determines the running mode and the step S24 which performs the calculation of equation (7) may be omitted, and the routine can be constructed to calculate the vehicle speed VSP in a step S24 regardless of the running mode.

In this embodiment, unlike the first and second embodiments, the rotation speed No of the output shaft 6

(ring gear 5C) is calculated from the rotation speed Nc of the carrier 5B and the rotation speed Nco1 of the sun gear 5A, both of which are part of the planetary gear set 5. Therefore, the rotation speed of the output shaft 6 can be precisely detected regardless of the running state of the vehicle, such as when the vehicle is stationary, when the vehicle is traveling in the neutral range (N), when the power recirculation clutch 9 is engaging due to a change over from the neutral range (N) to the drive range (D), or when the power recirculation clutch 9 and direct clutch 10 are halfway between engagement and disengagement due to a changeover of running mode.

Next, a fourth embodiment of this invention will be described referring to FIGS. 10–20.

In this embodiment, the control unit 80 controls the IVT speed ratio ii based on a map shown in FIG. 4 in the same way as in the first embodiment and controls the transmission torque of the power rollers 20. The creep torque of the vehicle is controlled using the rotation speed No of the output shaft 6 calculated in the same way as in the first embodiment as part of the control of transmission torque.

Figure 10:
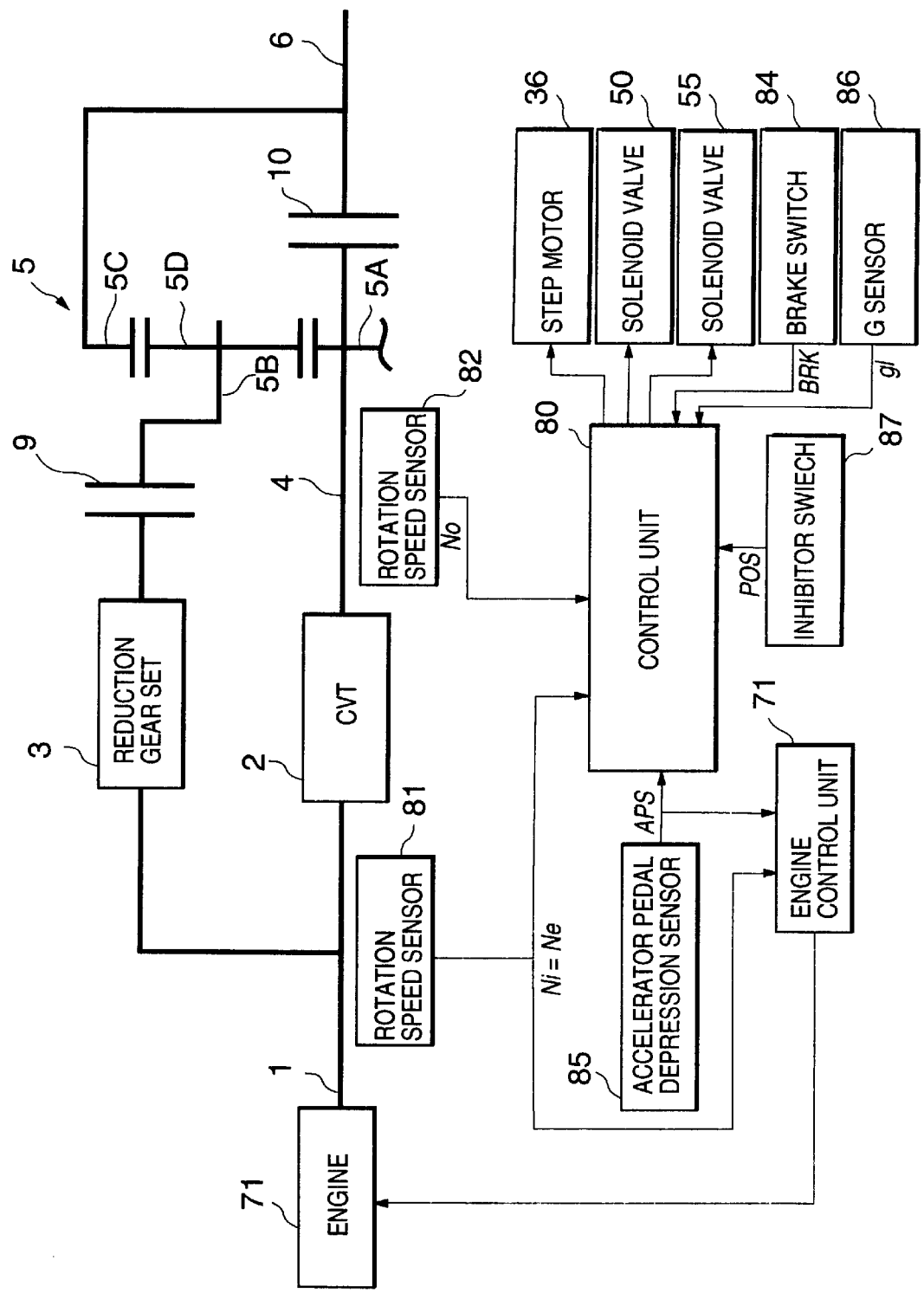
FIG. 10 is similar to FIG. 2, but showing a fourth embodiment of this invention.

To perform this control, as shown in FIG. 10, the rotation speed Ni of the input shaft 1 detected by the rotation speed sensor 81, rotation speed Nco1 of the sprocket 4A detected by the rotation speed sensor 82, accelerator pedal depression amount APS detected by the accelerator pedal depression sensor 85, brake signal BRK detected by the brake switch 84, a forward/reverse acceleration gl of the vehicle detected by G sensor 86, and the selection position signal POS detected by the inhibitor switch 87, are input as signals respectively to the control unit 80. The selection position signal POS comprises the forward range (D), reverse range (R), neutral range (N) and parking range (P).

An engine 71 driving the input shaft 1 is controlled by an engine control unit 70. The engine control unit 70 controls the fuel injection amount and ignition timing of the engine 71 based on the accelerator pedal depression amount APS and the engine rotation speed Ne. Specifically, in a state where the running range is the drive range (D) or the reverse range (R), the accelerator pedal depression amount APS is 0/8 and the vehicle speed VSP or engine rotation speed Ne is less than a predetermined value, or in a state where the running range is the neutral range (N) or parking range (P), the engine control unit 70 controls the engine 71 so that the engine rotation speed Ne coincides with a predetermined idle rotation speed Nidle.

Figure 11:
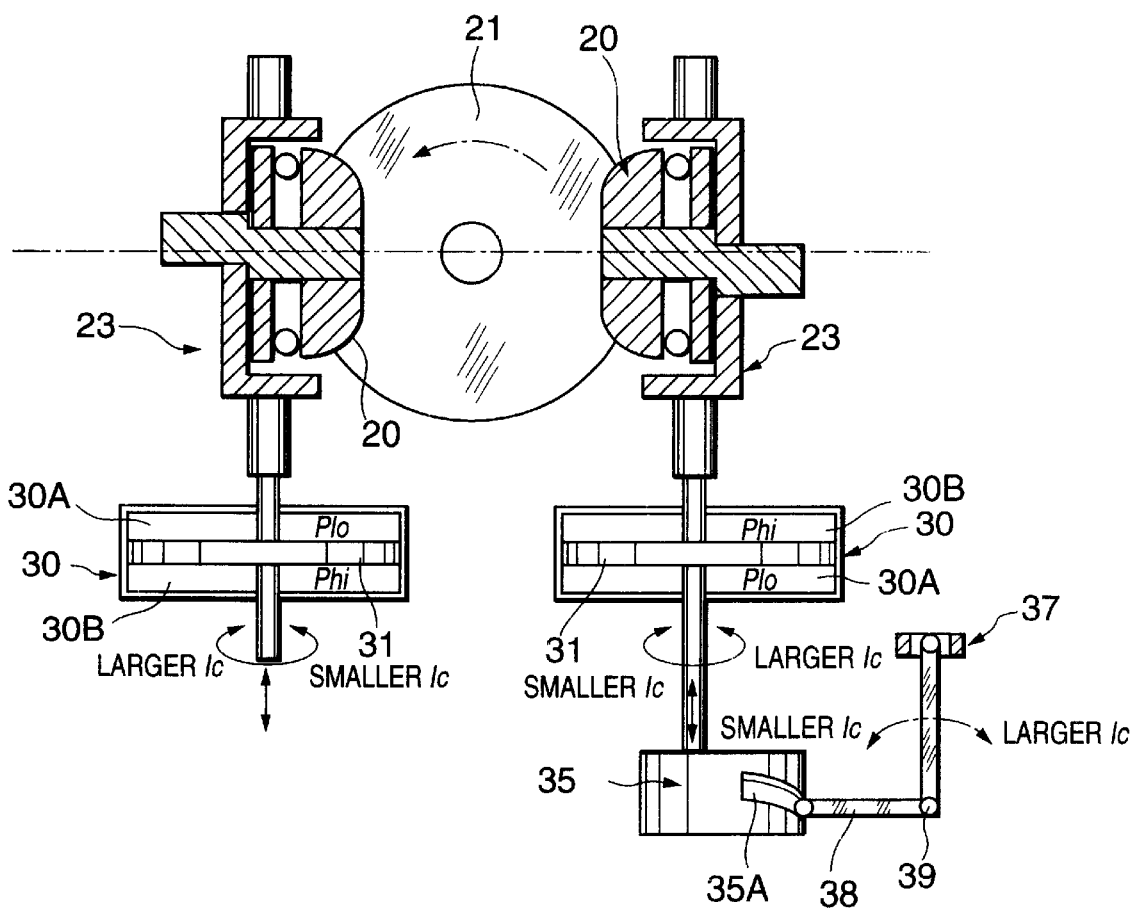
FIG. 11 is a schematic cross-sectional view of a toroidal continuously variable transmission to which the fourth embodiment of this invention is applied.

Next, the construction of the toroidal CVT 2 related to the control of the transmission torque will be explained referring to FIG. 11.

In the toroidal CVT 2, each power roller 20 is supported free to pivot by a trunnion 23. The trunnion 23 is driven in the vertical direction of the figure by an oil pressure cylinder 30. The oil pressure cylinder 30 comprises a piston 31 fixed to the trunnion 23, and oil chambers 30A, 30B formed facing the piston 31. The trunnion 23 displaces in an axial direction according to a differential pressure of the oil chambers 30A, 30B, and thereby changes the contact position between the power roller 20, input disk 21 and output disk 22. As a result, the balance of forces around the trunnion 23 exerted by the disks 21, 22 on the power roller 20 changes, and the gyration angle of the power roller 20 changes. As the gyration angle of the power roller 20 changes, the trunnion 23 also undergoes a rotational displacement. Due to the variation of the gyration angle of the power roller 20, the ratio of the rotation transmitted between the input disk 21 and the output disk 22, i.e., the speed ratio, varies continuously.

Of the trunnions 23 facing each other in one toroidal unit, the oil chamber 30A of one of the trunnions 23 is situated above the piston 31, and the oil chamber 30A of the other trunnion 23 is situated below the piston 31. Likewise, the oil chamber 30B of one of the trunnions 23 is situated below the piston 31, and the oil chamber 30B of the other trunnion 23 is situated above the piston 31. An identical oil pressure is supplied to the two oil chambers 30A, and likewise an identical oil pressure is supplied to the two oil chambers 30B. Due to this arrangement of the oil chambers 30A, 30B, the two trunnions 23 are driven in mutually opposite directions.

The CVT 2 comprises a total of four of the trunnions 23, one of the trunnions 23 being attached to a precess cam 35. An oil pressure is selectively supplied from a shift control valve 46 shown in FIG. 12 to the oil chambers 30A, 30B. The precess cam 35 feeds back a rotation angle of the trunnion 23, i.e., a gyration angle of the power roller 20, and the axial displacement of the trunnion 23, to the control valve 46. A slanting cam groove 35A is formed on the outer circumference of the precess cam 35, and one end of an L-shaped feedback link 38 fits in the cam groove 35A.

The feedback link 38 is supported free to pivot around a pivot shaft 39, one end being engaged with the cam groove 35A and the other end being connected to one end of a speed change link 37.

Figure 12:
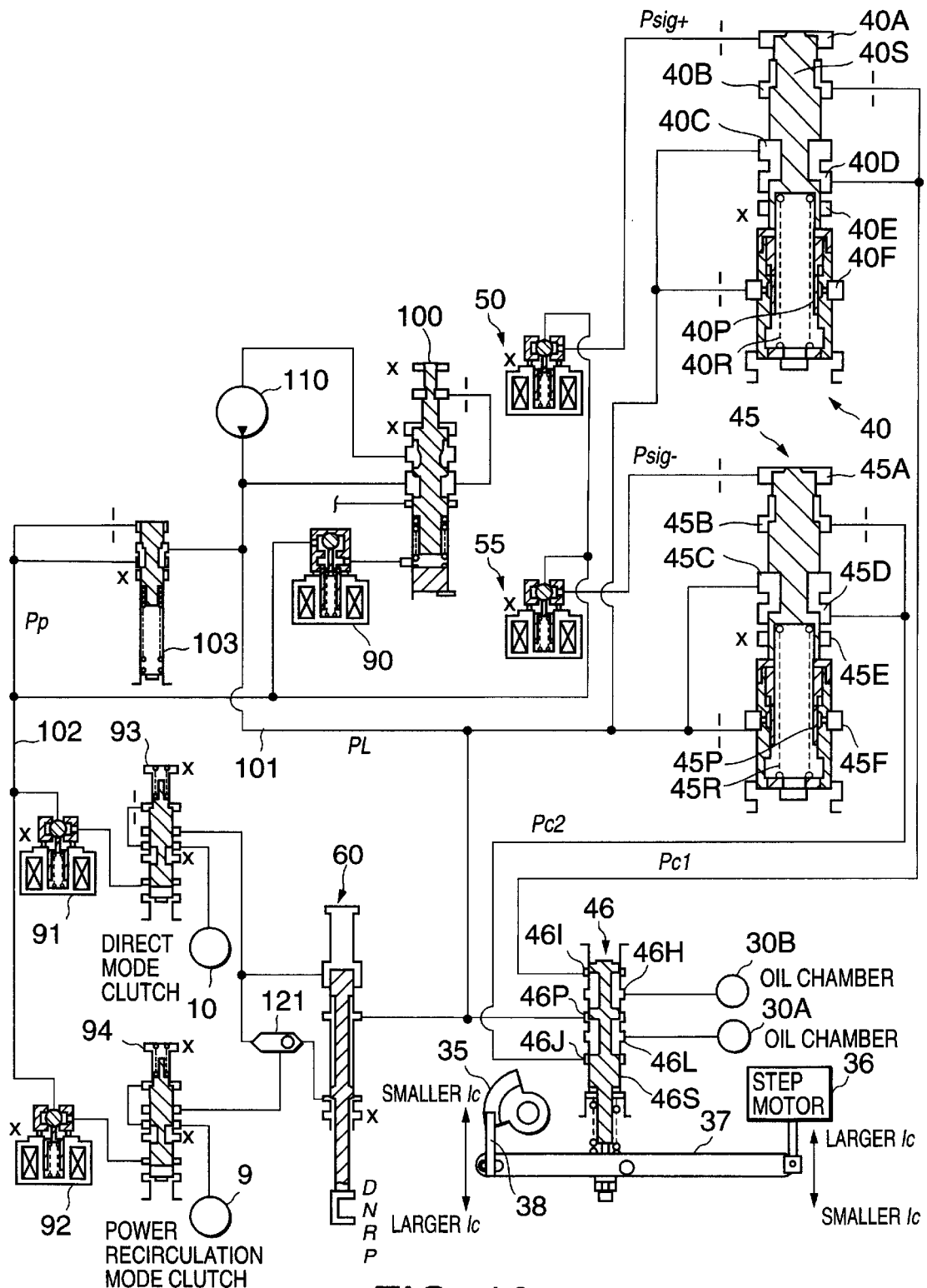
FIG. 12 is an oil pressure circuit diagram of the toroidal continuously variable transmission.

Referring to FIG. 12, the speed change link 37 is connected in its middle part to one end of a spool 46S of the shift control valve 46, and the end on the opposite side to the connection with the feedback link 38 is connected to a step motor 36. Due to this arrangement, in the speed change link 37 displaces the spool 46S in an axial direction under the drive of the step motor 36. Also, the spool 46S is displaced in an axial direction according to the rotational displacement and axial displacement of the precess cam 35. As a result, the spool 46S is maintained at a position where the displacements of the step motor 36 and precess cam 35 are balanced.

The oil pressure used for pressurizing the oil chambers 30A, 30B and the oil pressure used for engaging and disengaging the power recirculation clutch 9 and direct clutch 10 are supplied from the oil pressure circuit shown in FIG. 12.

This oil pressure circuit comprises an oil pump 110, a pilot valve 103, a line pressure solenoid valve 90, a pressure regulator valve 100, the shift control valve 46, a manual valve 60, clutch control valves 93, 94, solenoid valves 91, 92, a positive torque control valve 40, a negative torque control valve 45, and solenoid valves 50, 55. The solenoid valves 50, 55, 90, 91, 92 are all controlled by duty signals output from the control unit 80.

A discharge pressure of the oil pressure pump 110 is adjusted to a predetermined line pressure PL by the pressure regulator valve 100 in response to a signal pressure output by the line pressure solenoid valve 90, and is supplied to the line pressure circuit 101. The line pressure solenoid valve 90 generates a signal pressure from a pilot pressure Pp of a pilot pressure circuit 102 based on an input signal from the control unit 80, and outputs this to the pressure regulator valve 100. The pilot pressure Pp is generated by the pilot valve 103 in direct proportion to the line pressure PL.

The solenoid valve 91 which engages and disengages the power recirculation clutch 9, and a solenoid valve 92 which engages and disengages the direct clutch 10, are connected to the pilot pressure circuit 102.

The solenoid valve 91 increases or decreases the pilot pressure Pp of the pilot pressure circuit 102 according to an input signal from the control unit 80 to generate a signal pressure, and supplies this signal pressure to the clutch control valve 93. The clutch control valve 93 supplies the line pressure PL supplied via the manual valve 60 to the power recirculation clutch 9 according to an increase of the signal pressure from the solenoid valve 91, and thereby engages the power recirculation clutch 9. On the other hand, when the signal pressure from the solenoid valve 91 decreases, the clutch control valve 93 releases the power recirculation clutch 9 to a drain, and thereby disengages the power recirculation clutch 9.

Likewise, the solenoid valve 92 increases or decreases the pilot pressure Pp of the pilot pressure circuit 102 according to a signal from the control unit 80 to generate a signal pressure, and supplies this signal pressure to the clutch control valve 94. The clutch control valve 94 supplies the line pressure PL supplied via the manual control valve 60 and a shuttle valve 121 to the direct clutch 10 according to an increase of the signal pressure from the solenoid valve 92, and thereby engages the direct clutch 10. On the other hand, when the signal pressure from the solenoid valve 92 decreases, the clutch control valve 94 releases the direct clutch 10 to the drain, and thereby disengages the direct clutch 10.

When the control unit 80 outputs an engaging signal to one of the solenoid valves 91, 92, it always outputs a disengaging signal to the other valve. Due to this signal operation, when one of the power recirculation clutch 9 and direct clutch 10 is engaged, the other clutch is disengaged. In other words, a change-over is performed between the power recirculation mode and direct mode. This mode change-over takes place only when the D range has been selected and the CVT speed ratio ic reaches the rotation synchronous point RSP, as shown in FIG. 3.

The positive torque control valve 40, negative torque control valve 45, shift control valve 46 and manual valve 60 are connected to the line pressure circuit 101.

A pressure port 46P connected to the line pressure circuit 101, a first port 46H connected to the oil chamber 30B of the oil pressure cylinders 30, a second port 46L connected to the oil chamber 30A of the oil pressure cylinders 30, a drain port 46I connected to the positive torque control valve 40, and a drain port 46J connected to the negative torque control valve 45, are formed in the shift control valve 46. The spool 46S connects the oil chamber 30A to one of the drain port 46J and pressure port 46P. When the spool 46S connects the oil chamber 30A to the drain port 46J, it connects the oil chamber 30B to the pressure port 46P. Likewise, when the spool 46S connects the oil chamber 30A to the pressure port 46P, it connects the oil chamber 30B to the drain port 46I.

The positive torque control valve 40 generates a control pressure Pc1 from the pilot pressure Pp of the pilot pressure circuit 102 according to a signal pressure Pp of the solenoid valve 50 controlled by the control unit 80, and supplies this control pressure Pc1 to the drain port 46I. The negative torque control valve 40 generates a control pressure Pc2 from the pilot pressure Pp according to a signal pressure Psig− of the solenoid valve 55 controlled by the control unit 80, and supplies this control pressure Pc2 to the drain port 46J. The solenoid valves 50, 55 are permanently closed, and in the non-energized state, the signal pressures Pp, Psig− are both zero.

The positive torque control valve 40 comprises a spool 40S. A signal pressure port 40A, an output port 40D which outputs the control pressure Pc1, a feedback port 40B connected to the output port 40D, a pressure port 40C and a drain port 40E are formed in the positive torque control valve 40 facing the spool 40S. The signal pressure Pp of the solenoid valve 50 is input to the signal pressure port 40A. The lower end of the spool 40S is elastically supported facing upwards in FIG. 12 by a spring 40R. The positive torque control valve 40 further comprises a sleeve 40P in contact with the lower end of the spool 40S, and a port 40F formed facing the sleeve 40P. The line pressure PL is led to the port 40F. The spool 40S is held in a position where the downward force in the figure due to the signal pressure Pp of the signal pressure port 40A and the control pressure Pc1 led to the feedback port 40B, balances the upward force due to the spring 40R and line pressure PL of the port 40F. When the signal pressure Pp is equal to or less than a predetermined value, the output port 40C communicates with the drain port 46I of the shift control valve 46 via the output port 40D. When the signal pressure Pp increases, the spool 40S displaces downwards against the spring 40R, and the output port 40D communicates with the drain port 40E.

The pressure-receiving surface area of the control pressure Pc1 acting on the spool 40S via the feedback port 40B is set to a value As equal to the pressure-receiving area of the line pressure PL acting on the sleeve 40P via the port 40F. The spool 40S is pushed upwards due to the pressure difference of the line pressure PL and control pressure Pc1. Here, if the pressure-receiving surface area of the signal pressure Pp of the port 40A of the spool 40S is Asol, and the pushing force of the spring 40R is Fs, the equilibrium of forces acting on the spool 40S may be represented by the following equation (8).

$$Psig + \cdot Asol = (PL - Pc1) \cdot As + Fs \quad (8)$$

Herein, if $$M = \frac{Asol}{As} = \text{constant, and } N = \frac{Fs}{As} = \text{constant,}$$

equation (8) may be rewritten as follows.

$$PL - Pc1 = M \cdot Psig + -N \quad (9)$$

Equation (9) shows that a pressure difference ΔP=PL−Pc1 can be controlled by the signal pressure Pp. When the signal pressure Pp is 0, ΔP=PL−Pc1<0, the control pressure Pc1 is obtained by decreasing the line pressure PL, and it does not exceed the line pressure PL. Therefore, the spool 40S is pushed upwards by the pushing force Fs of the spring 40R, the output port 40C and the output port 40D are connected, and Pc1=PL.

Figure 13:
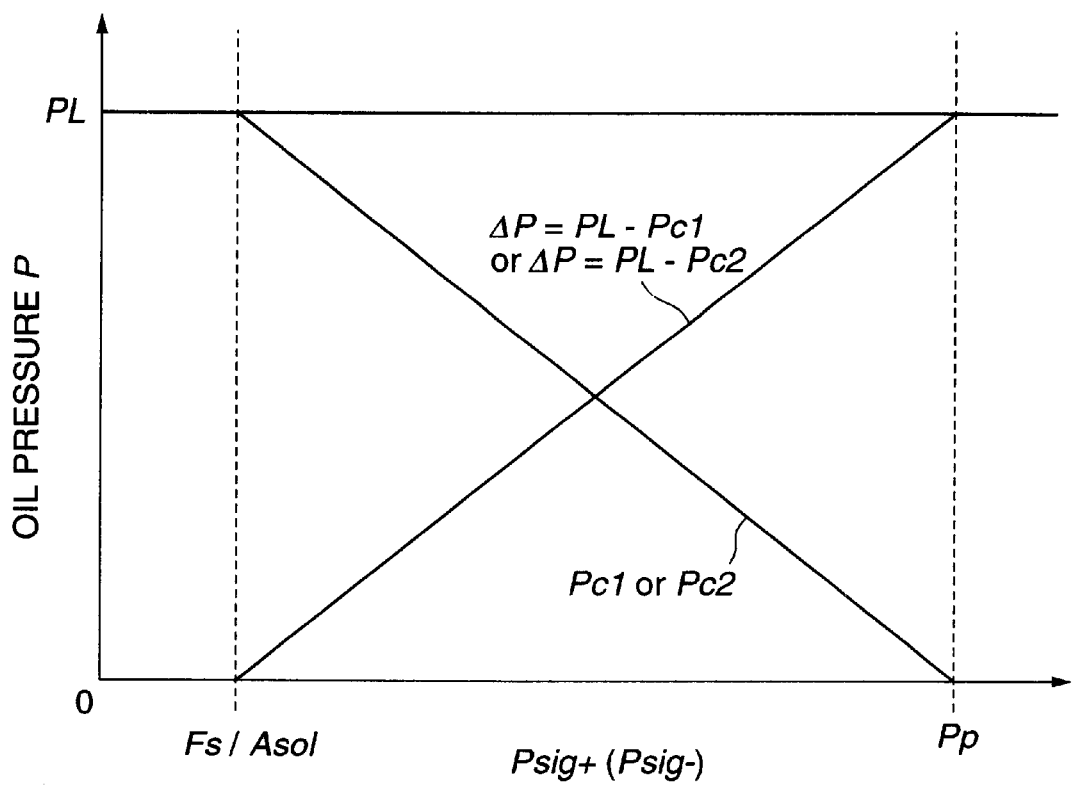
FIG. 13 is a diagram describing the relation between a signal pressure of a solenoid and an oil pressure controlled by a control unit according to the fourth embodiment of this invention.

Due to the pushing force Fs of this spring 40R, the control pressure Pc1 does not vary within the interval from when the signal pressure Pp=0 to when $$Psig += \frac{N}{M} = \frac{Fs}{Asol}$$

regardless of the signal pressure Pp as shown in FIG. 13. This range is the insensitive range of the positive torque control valve 40.

When the signal pressure Pp is greater than this range, the pressure difference ΔP increases according to the signal pressure Pp. Further, when the signal pressure Pp reaches the pilot pressure Pp which is the maximum value, the pressure port 40C is shut by the spool 40S and the output port 40D communicates with the drain port 40E, so the control pressure Pc1 is 0, and the pressure difference ΔP is equal to the line pressure PL. When the line pressure PL varies, the control pressure Pc1 also varies, and this characteristic therefore holds also when the line pressure PL varies. However, as there is the limitation 0<Pc1<PL, the range of the pressure difference ΔP becomes smaller the smaller the line pressure PL.

Hence, the positive torque control valve 40 controls the pressure difference ΔP according to the signal pressure Pp, and when the solenoid valve 50 is not energized, it makes the control pressure Pc1 equal to the line pressure PL so that the pressure difference ΔP=0.

Similarly, the negative torque control valve 45 comprises a signal pressure port 45A, a feedback port 45B, a pressure port 45C, an output port 45D which outputs a control pressure Pc2, a drain port 40E, a port 45F, a spool 45S and a spring 45R. The relation between the control pressure Pc2 and line pressure PL is similar to the relation between the control pressure Pc1 and line pressure PL as shown in FIG. 13.

Therefore, when the line pressure PL is supplied to the oil chamber 30A corresponding to the displacement of the spool 46S, the shift control valve 46 simultaneously supplies the control pressure Pc1 to the oil chamber 30B, and when the line pressure PL is supplied to the oil chamber 30B, the control pressure Pc2 is simultaneously supplied to the oil chamber 30A. For this reason, the pressure difference ΔP=PL−Pc1 or a pressure difference ΔP=PL−Pc2 always acts on the piston 31.

Here, the pressure difference ΔP is equal to the transmission torque of the power roller 20. Therefore, if the control pressure Pc1 is made equal to the line pressure PL, the transmission torque is zero. Also when the control pressure Pc2 is made equal to the line pressure PL, the transmission torque is zero.

Further, by varying the control pressure Pc1 or Pc2 between the line pressure PL and zero, the pressure difference ΔP can be set arbitrarily between the line pressure PL and zero so as to control the transmission torque of the power roller 20.

The above-described control of the transmission torque of the power roller 20 by the pressure difference ΔP is known by Tokkai Hei 11-247964 published by the Japanese Patent Office in 1999.

In order to control the transmission torque of the power roller 20 in this way, the shift control valve 46 has to be operated according to the direction of the torque that the oil pressure cylinder 30 supports.

The direction of the torque transmitted in the toroidal CVT 2 varies according to the operation mode of the IVT.

For the explanatory purpose, let torque transmission from the input disk 21 to the output disk 22 be the positive torque transmission direction, and torque transmission from the output disk 22 to the input disk 21 be the negative torque transmission direction.

In the direct mode, as the output torque of the CVT 2 is transmitted to the final output shaft 6, the vehicle is driven with a positive transmitted torque, and a negative transmitted torque acts as an engine brake.

Therefore, in the direct mode, the transmitted torque of the vehicle is controlled by controlling the positive transmitted torque of the CVT 2.

In the power recirculation mode, the power recirculation clutch 9 is engaged and the direct clutch 10 is disengaged, so in FIG. 1, forward/reverse motion of the vehicle is determined by the difference between the rotation speed of the carrier 5B rotating together with the output gear 3B of the reduction gear set 3, and the rotation speed of the sun gear 5A which depends on the speed ratio ic of the CVT 2. In the power recirculation mode, therefore, the direction of the torque passing through the CVT 2 varies according to the motion direction of the vehicle.

When the vehicle is moving forward in the power recirculation mode, it corresponds to the case where the rotation speed of the carrier 5B is greater than the rotation speed of the sun gear 5A, i.e., to the case where the speed ratio ic of the CVT 2 is greater than the geared neutral point GNP shown in FIG. 3. In this case, the torque is transmitted from the carrier 5B to the ring gear 5C and sun gear 5A. As a result, torque is input to the output disk 22 of the CVT 2 from the sprocket 4A via the chain 4B, and transmitted to the input disk 21 via the power rollers 20. In the toroidal CVT, therefore, torque is transmitted in the negative direction. The torque transmitted from the output disk 22 to the input disk 21 is further transmitted to the reduction gear set 3 via the unit input shaft 1, so the drive force is recirculated.

When the vehicle is reversing in the power recirculation mode, it corresponds to the case when the rotation speed of the sun gear 5A is much larger than the rotation speed of the carrier 5B, i.e., to the case when the speed ratio of the CVT 2 is smaller than the geared neutral point GNP shown in FIG. 3. In this case, the torque output from the toroidal CVT 2 to the sun gear 5A is transmitted to the carrier 5B and ring gear 5C. In the toroidal CVT 2, the torque is transmitted from the input disk 21 to the output disk 22, i.e., in the positive direction, The torque transmitted to the carrier 5B from the sun gear 5A is recirculated to the input disk 21 of the toroidal CVT 2 via the reduction gear set 3.

Therefore, when the vehicle is moving forward in the power recirculation mode, the drive torque of the vehicle can be controlled by controlling the negative torque passing through the toroidal CVT 2, and when the vehicle is reversing in the power recirculation mode, the drive torque of the vehicle can be controlled by controlling the positive torque passing through the toroidal CVT 2.

Figure 14:
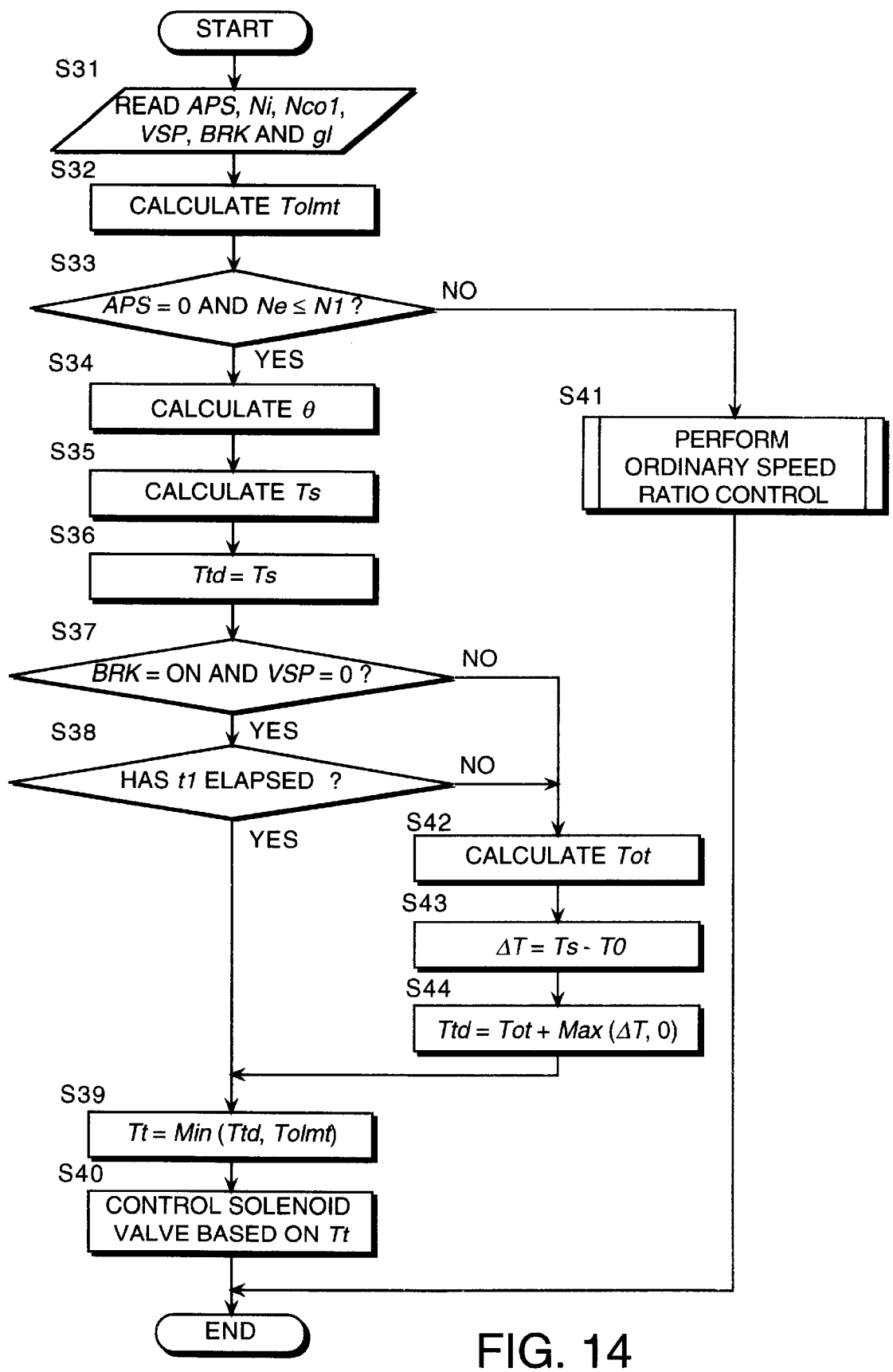
FIG. 14 is a flowchart describing a torque transmission control routine performed by the control unit according to the fourth embodiment of this invention.

Next, the creep torque control performed by the control unit 80 will be described referring to the flowchart of FIG. 14. This routine is performed as an interval of ten milliseconds when the running range POS is the drive range (D).

First, in a step S31, the accelerator pedal depression amount APS, input shaft rotation speed Ni, rotation speed Nco1 of the sprocket 4A, vehicle speed VSP, brake signal BRK, and the forward/reverse acceleration gl of the vehicle are read. The vehicle speed VSP is calculated by multiplying the rotation speed No of the IVT output shaft 6 by the constant K as in the case of the first embodiment.

Figure 15:
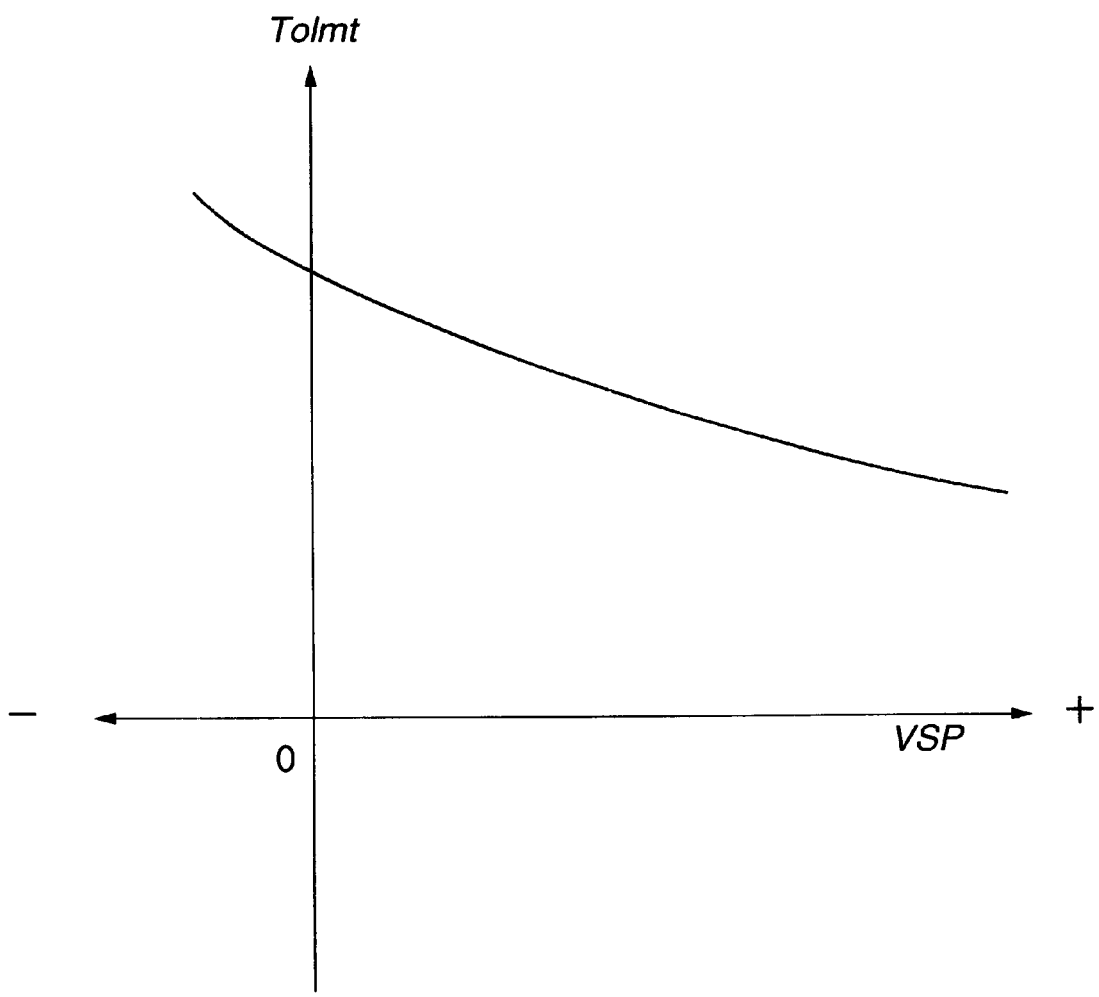
FIG. 15 is a diagram showing the contents of a map of an output torque limit Tolmt during idle control, stored by the control unit according to the fourth embodiment of this invention.

In a next step S32, the output torque limit Tolmt of the engine 71 during idle running is calculated from the vehicle speed VSP by looking up a map shown in FIG. 15. This map is prestored in the control unit 80.

In a next step S33, the creep torque control conditions are determined. When the accelerator pedal depression amount APS is zero, and the rotation speed Ne does not exceed a preset value N1, it is determined that creep torque control conditions are satisfied. The predetermined value N1 is for example set equal to the minimum speed for continuing fuel cut in the fuel cut control performed by the engine control unit 70.

When creep control conditions are satisfied, the routine proceeds to a step S34. When creep control conditions are not satisfied, the routine proceeds to a step S41, the ordinary speed change control process is performed and the routine is terminated.

In the determination of the step S33, the vehicle speed VSP may be compared with a predetermined vehicle speed instead of determining the engine rotation speed Ne. Alternatively, it may be determined whether or not fuel cut is performed instead of determining the engine rotation speed. Fuel cut is stopped when the engine rotation speed Ne decreases below the predetermined value N1 as described above. This is because the state when the accelerator pedal depression amount APS is 0 and fuel cut is not being performed is limited to the case when the engine rotation speed Ne is less than the predetermined value N1.

Figure 16:
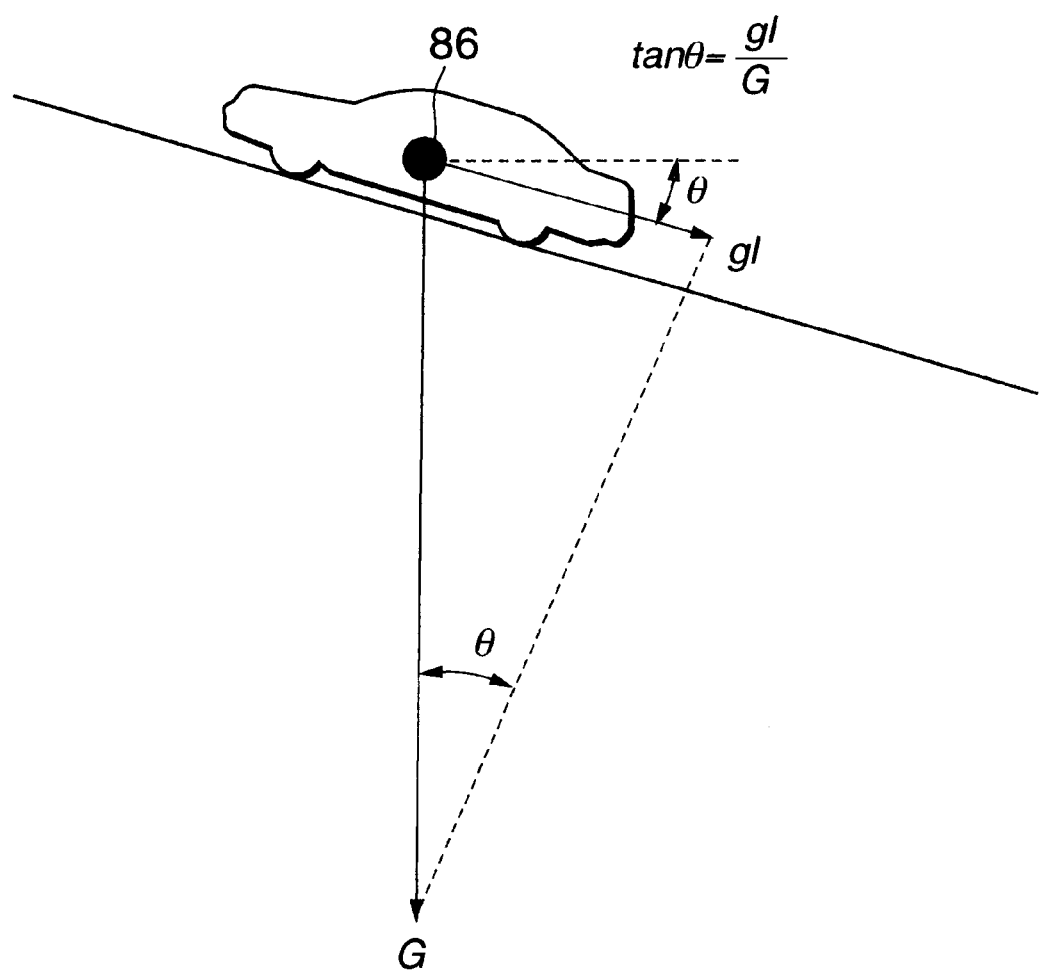
FIG. 16 is a diagram describing a detection principle for detecting a road surface slope $\theta$ applied by the control unit according to the fourth embodiment of this invention.

In the step S34, as shown in FIG. 16, the forward/reverse acceleration gl of the vehicle detected by the G sensor 86, and the road surface slope θ from the acceleration G due to gravity, are calculated by the equation $\tan θ = gl/G$. Here, a positive value for θ indicates an uphill slope, and a negative value for θ indicates a downhill slope.

Figure 17:
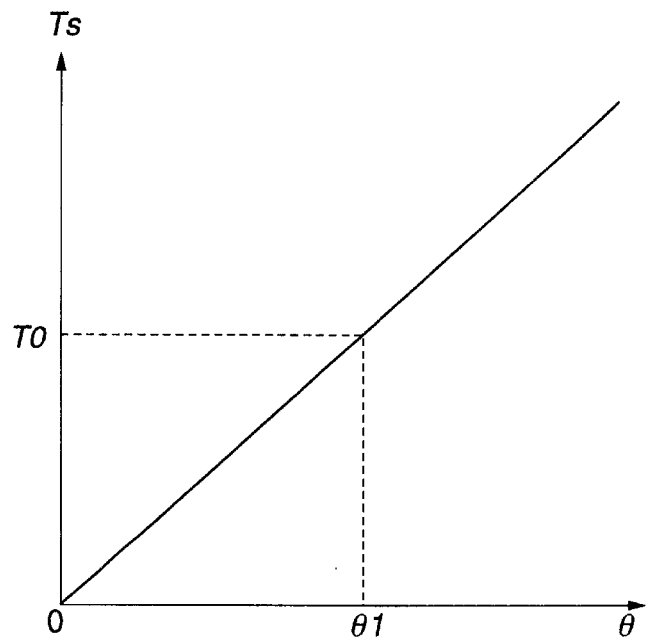
FIG. 17 is a diagram showing the contents of a map specifying an output torque Ts relative to the road surface slope $\theta$ stored by the control unit according to the fourth embodiment of this invention.

In a next step S35, the torque Ts required to stop the vehicle moving backwards is calculated from a map shown in FIG. 17 which is prestored in the control unit 80. In this map, when the road surface slope θ is 0, the torque Ts is also 0, and the torque Ts required to prevent the vehicle moving backwards also increases as the road surface slope θ increases.

In a next step S36, the torque Ts is set to a temporary creep torque target value Ttd. In a next step S37, it is determined whether or not the brake signal BRK is ON, and the vehicle speed VSP is 0 km/hr. When the brake signal BRK is ON and the vehicle speed VSP is 0 km/hr, the routine proceeds to a step S38. When either of these conditions is not satisfied, the routine proceeds to a step S42.

In the step S38, it is determined whether or not the state where the vehicle speed VSP is 0 km/hr has continued for a predetermined time t1. The predetermined time t1 is a value for determining whether or not the vehicle is really in the stationary state, and is set to one second or two seconds. When the vehicle speed VSP continues to be 0 km/hr for the predetermined time t1, the routine proceeds to a step S39. When the vehicle speed VSP is 0 km/hr for less than the predetermined time t1, the routine proceeds to the step S42.

The routine therefore directly proceeds to the step S39 from the step S38 when the brake pedal is depressed and the vehicle is completely stationary. If the vehicle moves slightly or the brake pedal is not depressed, or if the predetermined time t1 has not elapsed from when the vehicle is stationary, the routine proceeds to the step S42.

In the step S39, the smaller of the output torque limit Tolmt calculated in the step S32 and the temporary target value Ttd of the engine 71 during idle running is set as the target output torque Tt. When the target output torque Tt exceeds the limit Tolmt which can be output during idle running, the engine 71 stalls. Hence, a limit is applied to the target output torque Tt so that the engine 71 does not stall.

In a last step S40, the solenoid valve 50 or solenoid valve 55 of FIG. 12 is controlled so that the transmission torque of the power rollers 20 coincides with the target output torque Tt.

Figure 18:
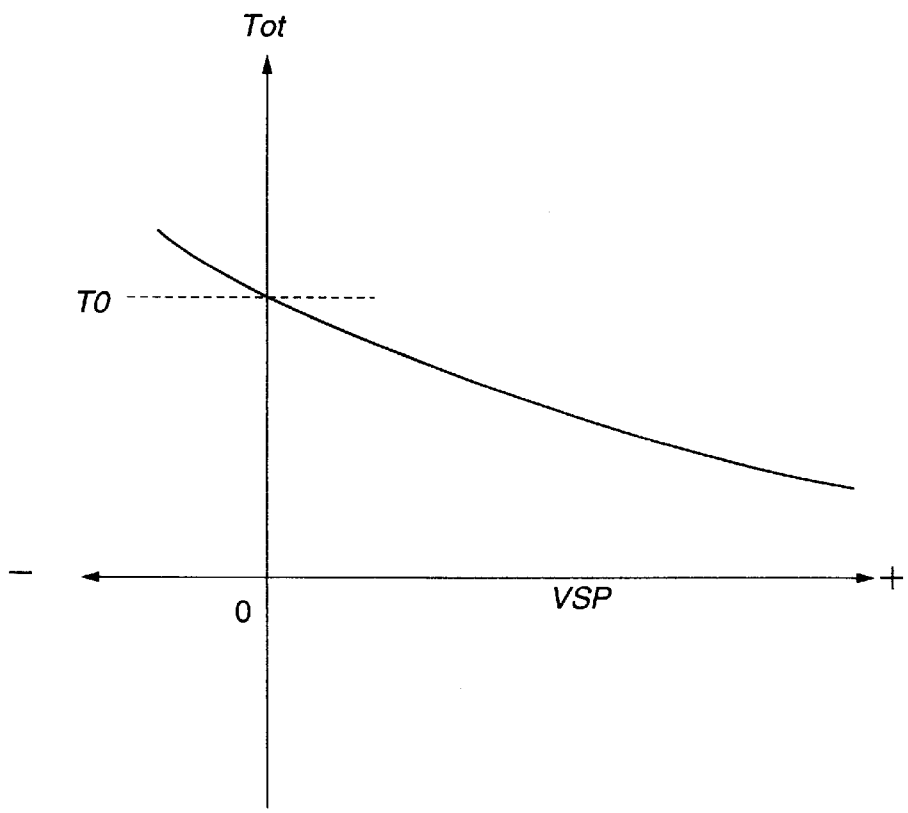
FIG. 18 is a diagram showing the contents of a map specifying a target output torque basic value Tot relative to a vehicle speed VSP, stored by the control unit according to the fourth embodiment of this invention.

On the other hand, in the step S42, a target output torque basic value Tot is computed according to the vehicle speed VSP by looking up a map shown in FIG. 18 which is prestored in the control unit 80. The target output torque basic value Tot is a target value of the creep torque on a road surface slope not exceeding a predetermined slope angle θ1.

In a next step S43, in the same map, a target output torque basic value T0 when the vehicle speed VSP is 0 km/h, is calculated. A creep torque correction amount ΔT according to the road surface slope θ is computed from $ΔT = Ts - T0$ using the output torque Ts in the state where the vehicle is stationary, but the same correction amount is applied even when the vehicle is running.

In a next step S44, the temporary target value Ttd is calculated by adding the correction amount ΔT to the target output torque basic value Tot calculated in the step S42.

However, even when the correction amount ΔT is a negative value, i.e., even when the road surface slope θ does not exceed θ1, the correction amount ΔT is set to 0 when ΔT is negative so that the temporary target value Ttd does not fall below the target output torque basic value Tot in the map of FIG. 18.

In this way, after the temporary target value Ttd is determined, the smaller of the output torque limit Tolmt of the engine 71 during idle running and the temporary target value Ttd is selected as the target output torque Tt in the step S39, as described above, and the solenoid valve 50 or solenoid valve 55 is controlled according to the target output torque Tt in the next step S40.

Under this routine, when the brake signal BRK is ON and the vehicle is starting from the stationary state, the temporary target value Ttd of the creep torque which can prevent the vehicle from moving backwards is calculated relative to the road surface slope θ by the process of the steps S34-S36, and the transmission torque of the toroidal CVT 2 is controlled in the steps S39 and S40 based on the temporary target value Ttd.

After the brake is released, the temporary target value Ttd of the creep torque is calculated according to vehicle speed VSP and the road surface slope θ by the process of the steps S42–44, and the transmission torque of the toroidal CVT 2 is controlled in the steps S39 and S40 based on the temporary target value Ttd.

In all these processes, the temporary target value Ttd is calculated based on the road surface slope θ, so the vehicle can start smoothly regardless of the road surface slope without generating a difference of creep torque when the brake is released.

The map of FIG. 18 which calculates the target torque basic value Tot from the vehicle speed VSP, gives a larger target output torque basic value Tot the lower the vehicle speed VSP. When the vehicle speed VSP is negative, i.e., when the vehicle is moving backwards on an uphill slope, an even larger target output torque basic value Tot is supplied.

When there is an error in the forward/reverse acceleration gl of the vehicle detected by the sensor 86, an error also occurs in the value of the road surface slope θ, and there is a possibility that the vehicle will move backwards when the brake is released. Even in this case, if the vehicle speed takes a negative value due to the backward motion, the map of FIG. 18 supplies a larger target output torque basic value Tot than when the vehicle speed VSP is 0 km/hr, so the backward motion of the vehicle is stopped. In other words, even when the brake is released from the stationary state on an uphill slope, and the vehicle begins to move backwards for some reason, the backward motion of the vehicle can be stopped due to increase of creep torque.

Figure 19:
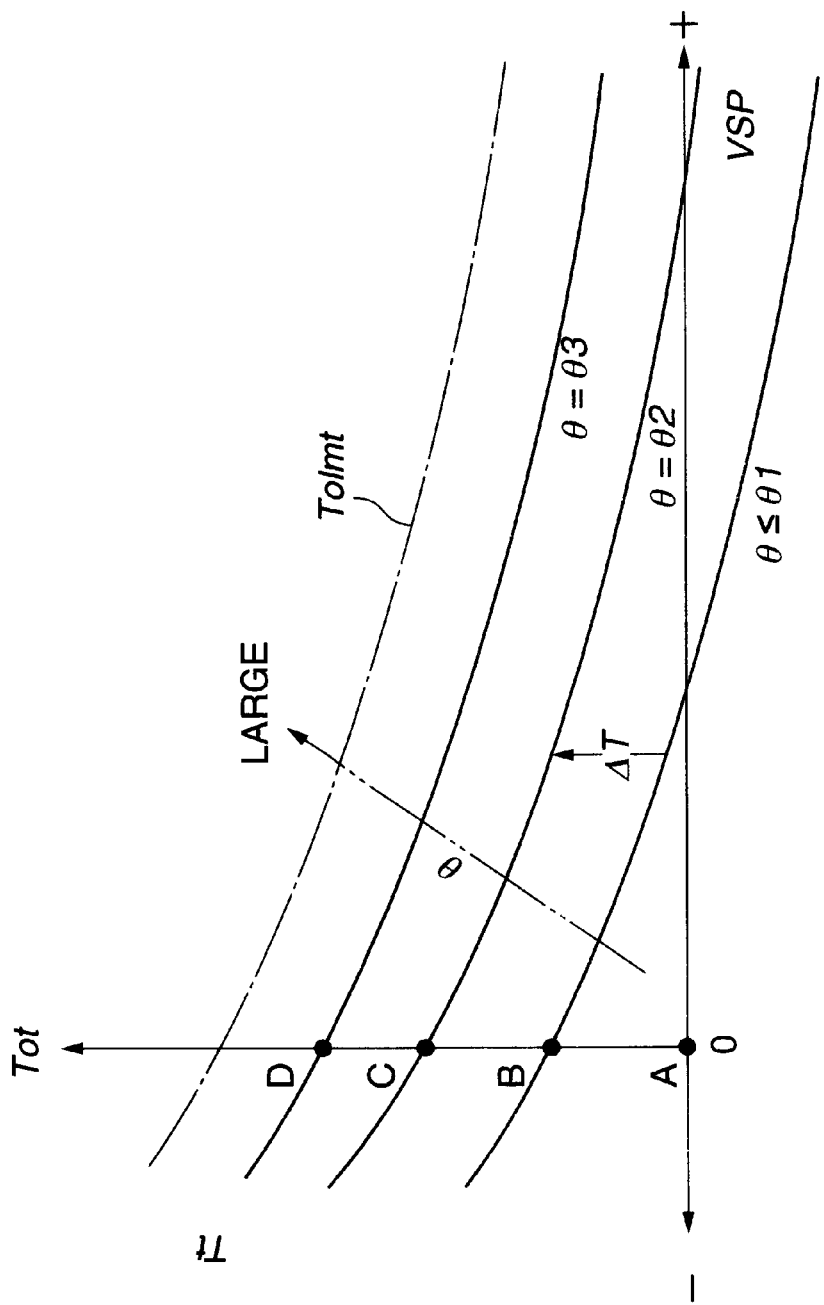
FIG. 19 is a diagram showing the contents of a map specifying the relation between the vehicle speed VSP, the road surface slope $\theta$ and a target output torque Tt, stored by the control unit according to the fourth embodiment of this invention.
Figure 20:
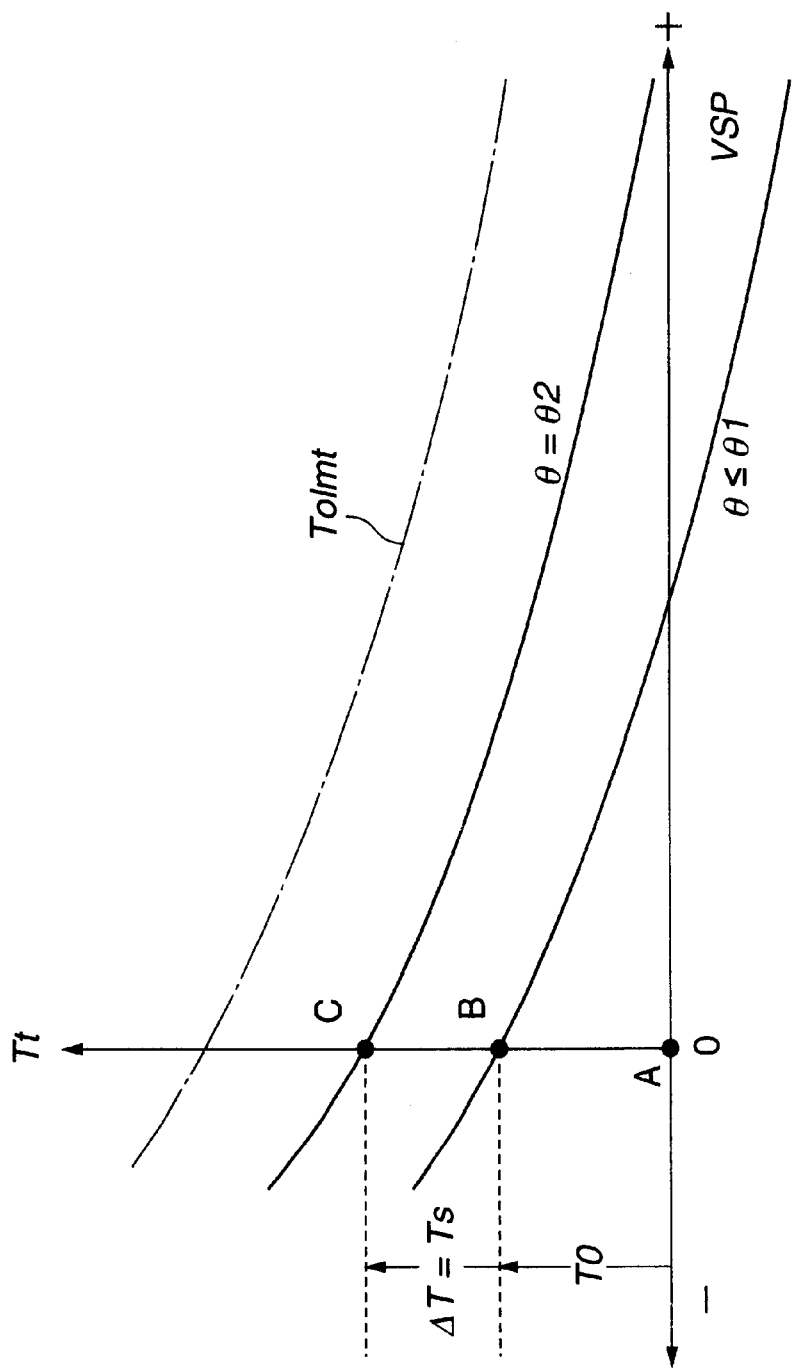
FIG. 20 is similar to FIG. 19, but showing a variation related to the setting of the target output torque Tt.

As a result, the target output torque Tt of the IVT varies as shown in FIG. 19 according to the vehicle speed VSP and road surface slope θ. Point A in the figure corresponds to a target output torque Tt when the road surface slope θ is zero, the brake signal BRK is ON and the vehicle speed VSP is zero.

In the above creep torque control, it is essential to distinguish between a positive and negative vehicle speed VSP corresponding to forward motion and backward motion of the vehicle, and this invention can satisfy this requirement. Also, in the steps S37 and S38, it is determined whether or not the vehicle speed VSP is 0 km/hr, and according to this invention, the vehicle speed VSP can be detected at high precision in the low vehicle speed region including 0 km/hr. Therefore, this invention has a particularly desirable effect when it is applied to control of creep torque at low vehicle speeds.

Further, as a sensor is not necessary to detect the rotation speed No of the output shaft 6 of the IVT, the number of sensors can be reduced.

A variation relating to calculation of the correction amount ΔT performed in the step S43 will now be described. Here, the correction amount ΔT is calculated by the equation ΔT=T0+Ts. The output torque Ts which can stop the vehicle moving backwards is added to the target output torque basic value T0 when the vehicle speed VSP is 0 km/hr, so the vehicle moves forward under a creep torque alone when the brake pedal is released from the stationary state even on an upward sloping surface.

In this case also, the creep torque produced in the stationary state is based on the torque Ts which stops reverse motion when the brake is released due to the processes of the steps S34-S36. Therefore, a creep torque sufficient to cause forward motion of the vehicle is produced only when the brake has been released without unnecessarily increasing the creep torque when braking force is applied.

The contents of Tokugan 2000-220654, with a filing date of Jul. 21, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A controller for an infinitely variable transmission, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, a differential mechanism having a first rotation element which rotates according to an output rotation of the continuously variable transmission, a second rotation element which rotates according to an output rotation of the fixed speed ratio transmission, and a third rotation element which varies a rotation direction and a rotation speed according to a difference between a rotation speed of the first rotation element and a rotation speed of the second rotation element, and an output shaft joined to the third rotation element, the controller comprising:

a first sensor which detects the rotation speed of the input shaft;

a second sensor which detects the output rotation speed of the continuously variable transmission; and a microprocessor programmed to:

calculate the rotation speed of the output shaft from the rotation speed of the input shaft and the output rotation speed of the continuously variable transmission; and control the speed ratio of the continuously variable transmission based on the rotation speed of the output shaft.

2. The controller as defined in claim 1, wherein the fixed speed ratio transmission comprises an input gear connected to the input shaft, and the first sensor comprises a sensor which detects the rotation speed of the input gear.

3. The controller as defined in claim 1, wherein the second sensor comprises a sensor which detects the rotation speed of the first rotation element.

4. The controller as defined in claim 1, wherein the differential mechanism comprises a planetary gear set wherein the first rotation element is a sun gear, the second rotation element is a planet carrier, and the third rotation element is a ring gear, the planet carrier supporting a planet gear which meshes with the sun gear and the ring gear and is free to rotate around the sun gear, and the microprocessor is further programmed to calculate a speed ratio of the continuously variable transmission from the rotation speed of the input shaft and the output rotation speed of the continuously variable transmission, and calculate the rotation speed of the output shaft from the speed ratio of the continuously variable transmission and a ratio of the number of teeth of the sun gear and the number of teeth of the ring gear.

5. The controller as defined in claim 1, wherein the differential mechanism comprises a planetary gear set wherein the first rotation element is a sun gear, the second rotation element is a planet carrier, and the third rotation element is a ring gear, the planet carrier supporting a planet gear which meshes with the sun gear and the ring gear and is free to rotate around the sun gear, and the microprocessor is further programmed to calculate a rotation speed of the planet carrier from the rotation speed of the input shaft and the fixed speed ratio, calculate a rotation speed of the sun gear from the output rotation speed of the continuously variable transmission, and calculate the rotation speed of the output shaft from the rotation speed of the planet carrier, the rotation speed of the sun gear, and a ratio of the number of teeth of the sun gear and the number of teeth of the ring gear.

6. The controller as defined in claim 1, wherein the first sensor comprises a sensor which detects a rotation speed of the second rotation element.

7. The controller as defined in claim 1, wherein the infinitely variable transmission further comprises a first clutch which interrupts transmission of the output rotation of the fixed speed ratio transmission to the second rotation element, and a second clutch which transmits the output rotation of the continuously variable transmission to the first rotation element, and the microprocessor is further programmed to directly calculate the rotation speed of the output shaft from the output rotation speed of the continuously variable transmission when the first clutch interrupts transmission of the output rotation of the fixed speed ratio transmission to the second rotation element, and the second clutch transmits the output rotation of the continuously variable transmission to the first rotation element.

8. The controller as defined in claim 1, wherein the input shaft is connected to a vehicle engine, the output shaft is connected to a vehicle drive shaft, and the microprocessor is further programmed to calculate a vehicle speed from the rotation speed of the output shaft, and control a transmission torque of the continuously variable transmission to increase as the vehicle speed decreases.

9. The controller as defined in claim 8, wherein the microprocessor is further programmed to control the transmission torque of the continuously variable transmission to be larger when the vehicle speed is a negative value than when the vehicle speed is a positive value.

10. The controller as defined in claim 9, wherein the controller further comprises a sensor which detects an uphill slope of a road surface, and the microprocessor is further programmed to control the continuously variable transmission to increase the transmission torque as the uphill slope of the road surface becomes larger.

11. A controller for an infinitely variable transmission, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, a differential mechanism having a first rotation element which rotates according to an output rotation of the continuously variable transmission, a second rotation element which rotates according to an output rotation of the fixed speed ratio transmission, and a third rotation element which varies a rotation direction and a rotation speed according to a difference between a rotation speed of the first rotation element and a rotation speed of the second rotation element, and an output shaft joined to the third rotation element, the controller comprising:

means for detecting the rotation speed of the input shaft;

means for detecting the output rotation speed of the continuously variable transmission;

means for calculating the rotation speed of the output shaft from the rotation speed of the input shaft and the output rotation speed of the continuously variable transmission; and means for controlling the speed ratio of the continuously variable transmission based on the rotation speed of the output shaft.

12. A control method for an infinitely variable transmission, the infinitely variable transmission comprising an input shaft, a continuously variable transmission which outputs the rotation of the input shaft at an arbitrary speed ratio, a fixed speed ratio transmission which outputs the rotation of the input shaft at a fixed speed ratio, a differential mechanism having a first rotation element which rotates according to an output rotation of the continuously variable transmission, a second rotation element which rotates according to an output rotation of the fixed speed ratio transmission, and a third rotation element which varies a rotation direction and a rotation speed according to a difference between a rotation speed of the first rotation element and a rotation speed of the second rotation element, and an output shaft joined to the third rotation element, the method comprising:

detecting the rotation speed of the input shaft;

detecting the output rotation speed of the continuously variable transmission;

calculating the rotation speed of the output shaft from the rotation speed of the input shaft and the output rotation speed of the continuously variable transmission; and controlling the speed ratio of the continuously variable transmission based on the rotation speed of the output shaft.

* * * * *